(12) United States Patent
Brown et al.

(10) Patent No.: US 7,276,225 B2
(45) Date of Patent: *Oct. 2, 2007

(54) PROCESS FOR PRODUCING NIOBIUM AND TANTALUM COMPOUNDS

(75) Inventors: Patrick M. Brown, Exton, PA (US); Rong-Chein R. Wu, Phoenixville, PA (US); Raymond C. Pedicone, Pottstown, PA (US); Michael G. Madara, Shillington, PA (US)

(73) Assignee: Cabot Corporation, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/142,066

(22) Filed: Jun. 1, 2005

(65) Prior Publication Data

US 2005/0232850 A1  Oct. 20, 2005

Related U.S. Application Data

(60) Division of application No. 10/047,440, filed on Jan. 14, 2002, now Pat. No. 6,984,370, which is a continuation of application No. 08/542,286, filed on Oct. 12, 1995, now Pat. No. 6,338,832.

(51) Int. Cl.
*C01G 33/00* (2006.01)
*C01G 35/00* (2006.01)

(52) U.S. Cl. .................................... 423/594.17
(58) Field of Classification Search ........... 423/594.17
See application file for complete search history.

(56) References Cited

U.S. PATENT DOCUMENTS

| 1,802,242 | A | 4/1931 | Fink et al. | |
| 2,819,945 | A | 1/1958 | Ruhoff et al. | 23/18 |
| 2,950,966 | A | 8/1960 | Foos | 75/121 |
| 2,953,453 | A | 9/1960 | Foos | 75/121 |
| 3,072,459 | A | 1/1963 | Foos et al. | 23/23 |
| 3,107,976 | A | 10/1963 | Koerner et al. | 423/66 |
| 3,112,169 | A | 11/1963 | Berthold et al. | 23/32 |
| 3,658,511 | A | 4/1972 | Gustison | 75/101 |
| 3,712,939 | A | 1/1973 | Capps et al. | 423/63 |
| 4,446,115 | A | 5/1984 | Endo et al. | 423/63 |
| 4,537,750 | A | 8/1985 | Ritsko et al. | 423/65 |
| 4,673,554 | A | 6/1987 | Niwa et al. | 423/65 |
| 4,741,894 | A | 5/1988 | Melas | 423/592 |
| 4,942,024 | A | 7/1990 | Sasaki et al. | 423/65 |
| 4,948,570 | A | 8/1990 | Sommers | 423/65 |
| 5,068,097 | A | 11/1991 | Eckert et al. | 423/592 |
| 5,194,232 | A | 3/1993 | Bludssus et al. | 423/65 |
| 5,209,910 | A | 5/1993 | Bludssus et al. | 423/63 |
| 6,338,832 | B1 | 1/2002 | Brown et al. | 423/592 |
| 6,391,275 | B1 | 5/2002 | Fife | 423/592 |

FOREIGN PATENT DOCUMENTS

| CA | 556022 | 4/1958 | | 423/66 |
| DE | 3428788 A1 | 4/1985 | | |
| DE | 4030707 | 4/1992 | | 423/66 |
| EP | 402 687 A1 | 12/1990 | | |
| JP | 1115820 | 5/1989 | | 423/66 |
| JP | 01-176226 | 7/1989 | | |
| JP | 1176226 | 7/1989 | | 423/66 |
| JP | 5-85727 | 4/1993 | | |
| JP | 7-101726 | 4/1995 | | |
| JP | 8-12333 | 1/1996 | | |
| WO | WO 95/16635 | 6/1995 | | |

OTHER PUBLICATIONS

Translation of Japan 1-176226, Jul. 1989, pp. 1-9.*
Interlocutory decision in Opposition proceedings (Articles 102(3) and 106(3) EPC for European Patent No. 0854841, no date.
Provision of a copy of the minutes in accordance with Rule 76(4) EPC for European Patent No. 0854841, no date.
Brief filed by H.C. Starck on Oct. 6, 2005, Opposition against EP 0 854 841 B1 (Application No. 96937666.4) "Niobium and Tantalum Pentoxide Compounds." (with full English translation).
D13: Annex to Substantiation of Appeal regarding EP 854841, graph (with full English translation).
Hervieu et al., "Ion Exchange Properties of Some Pyrochore Type Ternary Oxides: the Pyrochores $H_{1+x}(H_2O)Ta_{1+x}O_6$ and $NH_4TaWO_6$", UER Sciences, Universite de Caen, Esplanade de la Paiz, 14-Caen, Jun. 9, 1971 (with full English translation).
Groult et al., "Neutron Diffraction Study of the Defect Pyrochlores $TaWO_{5.5}$, $HTaWO_6$, $H_2Ta_2O_6$, and $HTaWO_6 \cdot H_2O$", Journal of Solid State Chemistry, vol. 41, 1982, pp. 277-285.
D17: RBA reference card PDF No. 01-0752353 (with translation).
Brief filed by Cabot Corporation on May 23, 2006, opposition against EP 0 854 841 B1 with 15 auxiliary requests.
Minutes of Oral Proceedings for Opposition of EP 0 854 841 B1 dated Jun. 7, 2005.
Interlocutory Decision in Opposition Proceedings of EP 0 854 841 B1 dated Jun. 3, 2005.
Shuki Abe, "A Fine Powder; Manufacturing and Application Thereof," Technology of Treating Resources, vol. 33, No. 4, (winter) pp. 199-217, 1986. Includes partial translation.
ASTM Designation: B 213-90, Standard Test Method for Flow Rate of Metal Powders, no date.
Cabot Performance Materials; "Recent Developments in Tantalum Ore Processing" by Patrick M. Brown, no date.
Kawakita et al., "Some considerations on Tapping Compaction," Milling No. 19, pp. 100-105 (1974).
Kimio, "Packing and bulk density of powder," Milling No. 18, pp. 112-125 and 131 (1973).

(Continued)

*Primary Examiner*—Steven Bos

(57) ABSTRACT

A process for producing valve metal oxides, such as tantalum pentoxide or niobium pentoxide with a narrow particle size distribution within a desired particle size range, is provided. According to the process of the present invention, the valve metal fraction from digestion of valve metal material containing ore is processed under controlled temperature, pH, and residence time conditions to produce the valve metal pentoxide and pentoxide hydrates. Also, disclosed are new tantalum pentoxide and niobium pentoxide products and new tantalum pentoxide precursors and niobium pentoxide precursors.

27 Claims, 7 Drawing Sheets

OTHER PUBLICATIONS

Iwanami's Dictionary of Physics and Chemistry, 3rd Ed., pp. 514-516, and 517 (1971).

Rakov, Metallurgija Publishing House, "Processes and Installations of Production Facilities of Radioactive and Rare Metals," Moscow 1993, pp. 257-260. (original pages and translation).

Translation of Brief filed by H.C. Starck on Dec. 8, 2004, Opposition against EP 0 854 841 B1 (Application No. 96937666.4) "Niobium and Tantalum Pentoxide Compounds.".

D3C: Purchase Order—Kyocera K.K. (with translation), no date.
D3D: Delivery Note—Kyocera K.K. (with translation), no date.
D3E: Inspection Certificate Lot 930367, no date.
D3F: Dispatch Note Kyocera, no date.
D3H: Customer Acceptance, no date.
D4A: Cabot Material Evaluation Report, Jun. 11, 1986.
D5C: 2 Purchase Orders Asahi Kogaku Kogyo (with translation), no date.
D5D: 2 Purchase Orders Asahi Kogaku Kogyo (with translation), no date.
D5E: Invoice Asahi Kogaku Kogyo (with translation), no date.
D5F: Invoice Asahi Kogaku Kogyo (with translation), no date.
Invoice Asahi Kogaku Kogyo (with translation), no date.
D5H: Inspection Certificate Asahi Optical, no date.
D5K: Dispatch Note Asahi Optical, Jun. 16, 1993.
D5L: Invoice H.C. Starck Japan, Jun. 15, 1993.
D5M: Invoice H.C. Starck Japan, Jun. 15, 1993.
D5N: Dispatch Note Asahi Optical, Jun. 16, 1993.
D5O: Inspection Certificate Asahi Optical, Jun. 10, 1993.
D11: Experimental Data "$Nb_2O_5$ Precipitations according to DE 3428788 A1" (with translation), no date.
D12: Experimental Data $Ta_2O_5$/$Nb_2O_5$ Precipitations according to EP 0854841 B1 (with translation), no date.

* cited by examiner

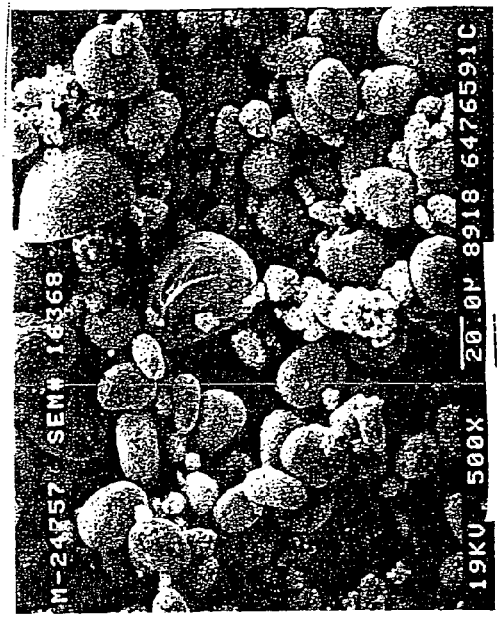
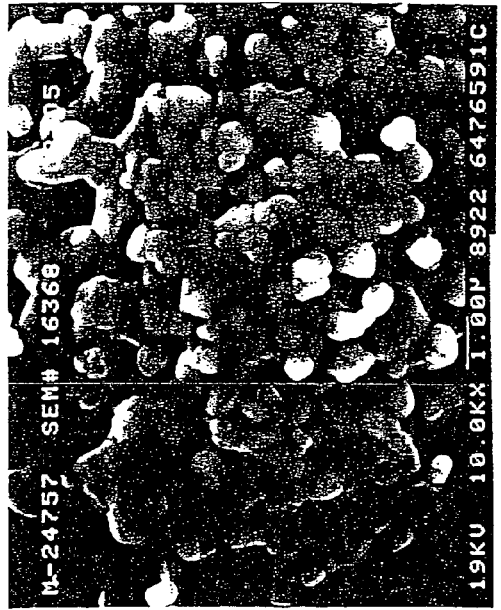
FIG. 2b
FIG. 2d
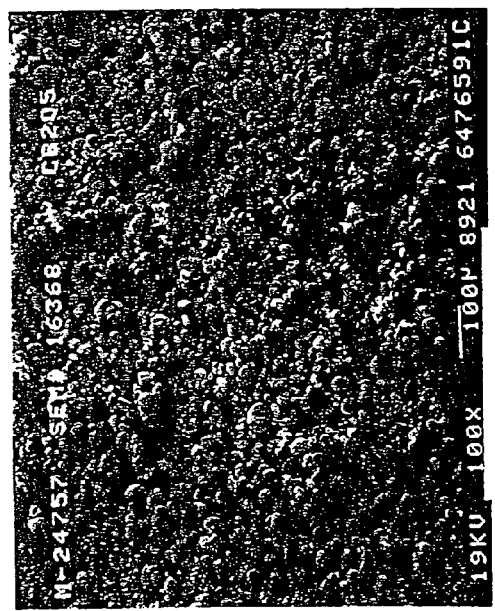
FIG. 2a
FIG. 2c

PROCESS FOR PRODUCING NIOBIUM AND TANTALUM COMPOUNDS

This present application is a divisional application of U.S. patent application Ser. No. 10/047,440, filed Jan. 14, 2002, now U.S. Pat. No. 6,984,370, which is a continuation of prior U.S. patent application Ser. No. 08/542,286 filed Oct. 12, 1995, now U.S. Pat. No. 6,338,832 B1.

FIELD OF THE INVENTION

The present invention relates to an improved process for producing valve metal compounds, such as niobium (columbium) compounds including niobium oxides and niobium hydrates, and tantalum compounds including tantalum oxides and tantalum hydrates. The present invention also relates to novel valve metal compounds, in particular to novel niobium oxides, niobium hydrates, tantalum oxides and tantalum hydrates.

BACKGROUND OF THE INVENTION

The term "valve metal" refers to metals such as vanadium, tantalum and niobium that are often utilized in valves, such as the intake/exhaust valves in engines. A commercially valuable form of a valve metal is a valve metal oxide such as a tantalum pentoxide, ($Ta_2O_5$) or a niobium pentoxide ($Nb_2O_5$) which are produced from mineral ores.

Minerals of concentrates containing tantalum and niobium are conventionally extracted with hydrofluoric acid (HF) or mixtures of hydrofluoric acid and sulfuric acid ($HF/H_2SO_4$). The tantalum and niobium heptafluoro complexes formed are typically separated by solvent extraction.

In a conventional process for producing tantalum pentoxide ($Ta_2O_5$), the tantalum fraction from the ore and solvent extraction is stripped into the aqueous phase, and tantalum pentoxide is precipitated using ammonia and recovered by filtration. Niobium pentoxide may be produced in a similar fashion.

Typical conventional processes for producing niobium pentoxides/hydrates and tantalum pentoxides/hydrates are batch processes Disadvantages inherent with batch processes include the need to clean and reload processing vessels, that batch size is limited to the size of the processing equipment, and that the production of large quantities of material requires multiple batch runs.

In addition, in conventional processes for producing tantalum pentoxides/hydrates and niobium pentoxides/hydrates it is difficult to control the particle size, and the particle size distribution of the pentoxides and hydrates produced.

For many applications, it is desirable to have a tantalum pentoxide, or niobium pentoxide, product with a consistent particle size (i.e. a narrow particle size distribution). In addition, for many applications it is desirable to have a tantalum pentoxide, or niobium pentoxide, having large dense spherical particles (a particle size greater than or equal to 5 micrometers (μm)) and a bulk density of 2.0 g/cc or greater for $Ta_2O_5$ and 1.2 g/cc or greater for $Nb_2O_5$. For other applications low bulk density fine particle sizes are preferred (a particle size less than or equal to 5 μm) and a bulk density of less than 2.0 for $Ta_2O_5$ and less than 1.2 for $Nb_2O_5$. The present invention advantageously allows the production of tantalum pentoxide, or niobium pentoxide, products with narrow particle size distributions within a desired particle size range.

SUMMARY OF THE INVENTION

The present invention provides a process for producing valve metal pentoxides, such as tantalum pentoxide or niobium pentoxide, with a narrow particle size distribution within a desired particle size range.

According to the present invention a process for producing valve metal pentoxides comprises:

reacting an aqueous solution comprising a valve metal compound with a base solution under controlled temperature, pH and residence time conditions to precipitate valve metal pentoxide precursor;

converting the valve metal pentoxide precursor to valve metal pentoxide; and separating and recovering the valve metal pentoxide. Among the valve metal compounds suitable for use in the process of the present invention are included the valve-metal compounds found in naturally occurring ores and valve metal compounds produced as products or by-products in industrial processes.

In a preferred embodiment of the process of the present invention, the aqueous solution comprises a valve-metal fluoro compound such as those formed during digestion of naturally occuring tantalum and niobium containing ores. The aqueous solution in this preferred embodiment of the present invention will be an aqueous-flouro solution. According to the process of the present invention a valve metal-fluoro compound material is processed under controlled temperature, pH and residence time conditions to produce the valve metal pentoxide. In particular, according to the present invention, a process for producing a valve metal pentoxide comprises:

reacting an aqueous fluoro-solution comprising a valve metal-fluoro compound with an ammonia containing solution under controlled temperature, pH and residence time conditions to precipitate valve metal pentoxide precursor;

converting the valve metal pentoxide precursor to valve metal pentoxide; and separating and recovering the valve metal pentoxide.

Further details relating to the process of the present invention are set forth below in the Detailed Description of the Invention Section.

The present invention also provides new valve metal pentoxide products, in particular new niobium pentoxide products and new tantalum pentoxide products.

A first embodiment of calcined niobium pentoxide powders of the present invention may be characterized by having a BET surface area of less than or equal to 6 square meters per gram ($m^2/g$), preferably less than or equal to 3 $m^2/g$, more preferably less than or equal to 0.5 $m^2/g$; and a packed bulk density of greater than 1.8 grams per cubic centimeter (g/cc), preferably greater than or equal to 2.1 g/cc. The first embodiment of calcined niobium pentoxide powders may be further characterized as comprising substantially spherical particles.

A second embodiment of calcined niobium pentoxide powders of the present invention may be characterized by having a BET surface area of greater than or equal to 2 $m^2/g$, preferably greater than or equal to 4 $m^2/g$, more preferably greater than or equal to 6 $m^2/g$; and a packed bulk density of less than or equal to 1.8 g/cc, preferably less than or equal to 1.0 g/cc, more preferably less than or equal to 0.75 g/cc.

A first embodiment of calcined tantalum pentoxide powders of the present invention may be characterized by having a BET surface area of less than or equal to 3 $m^2/g$, preferably less than or equal to 0.75 $m^2/g$, more preferably less than or equal to 0.4 $m^2/g$; and a packed bulk density of greater than 3.0 g/cc, preferably greater than or equal to 3.8 g/cc, more preferably greater than or equal to 4.0 g/cc. The first embodiment of calcined tantalum pentoxide powders may be further characterized as comprising substantially spherical particles.

A second embodiment of calcined tantalum pentoxide powders of the present invention may be characterized by having a BET surface area of greater than or equal to 3 $m^2/g$, preferably greater than or equal to 7 $m^2/g$, more preferably greater than or equal to 11 $m^2/g$; and a packed bulk density of less than or equal to 3.0, preferably less than or equal to 1.1 g/cc, more preferably less than or equal to 0.75 g/cc.

Further details relating to the products of the present invention are also set forth in the following Detailed Description of the Invention section.

In addition, the present invention provides new valve metal pentoxide precursors, in particular new niobium pentoxide precursors and new tantalum pentoxide precursors. The valve metal pentoxide precursors of the present invention may be processed to produce advantageous valve metal pentoxide products.

The valve metal pentoxide precursors of the present invention are characterized by having a line broadened d-value under x-ray analysis at:

6±0.3;
3±0.2; and
1.8±0.1.

A first embodiment of niobium pentoxide precursors of the present invention may be further characterized by having a BET surface area of less than or equal to 3 $m^2/g$, preferably less than or equal to 0.5 $m^2/g$; and a Fluoride content of less than or equal to 500 parts per million (ppm), preferably less than or equal to 150 ppm.

A second embodiment of niobium pentoxide precursors of the present invention may be further characterized by having a BET surface area of greater than 3 $m^2/g$, preferably greater than or equal to 50 $m^2/g$; and a Fluoride content of less than or equal to 500 ppm, preferably less than or equal to 150 ppm.

A first embodiment of tantalum pentoxide precursors of the present invention may be further characterized by having a BET surface area of less than or equal to 3 $m^2/g$, preferably less than or equal to 0.4 $m^2/g$; and a Fluoride content of less than or equal to 500 ppm, preferably less than or equal to 150 ppm.

A second embodiment of tantalum pentoxide precursors of the present invention may be further characterized by having a BET surface area of greater than 3 $m^2/g$, preferably greater than or equal to 17 $m^2/g$; and a Fluoride content of less than or equal to 500 ppm, preferably less than or equal to 150 ppm.

The valve metal pentoxide precursors of the present invention are described in more detail in the following Detailed Description of the Invention section.

BRIEF DESCRIPTION OF THE DRAWINGS

FIGS. 2a, 2b, 2c and 2d are scanning electron microscope (SEM) photographs of a calcined niobium pentoxide powder of the present invention produced in the manner described in Example 3 below. FIG. 2a was produced at 100 times magnification, FIG. 2b at 500 times magnification, FIG. 2c at 1000 times magnification and FIG. 2d at 10,000 times magnification.

FIG. 3a was produced at 100 times magnification, FIG. 3b at 500 times magnification; FIG. 3c at 1000 times magnification and FIG. 3d at 10,000 times magnification.

FIG. 4a was produced at 100 times magnification, FIG. 4b at 500 times magnification, FIG. 4c at 1000 times magnification and FIG. 4d at 5,000 times magnification.

FIG. 5a was produced at 100 times magnification, FIG. 5b at 500 times magnification, FIG. 5c at 1000 times magnification and FIG. 5d at 5,000 times magnification.

DETAILED DESCRIPTION OF THE INVENTION

Figure 1:
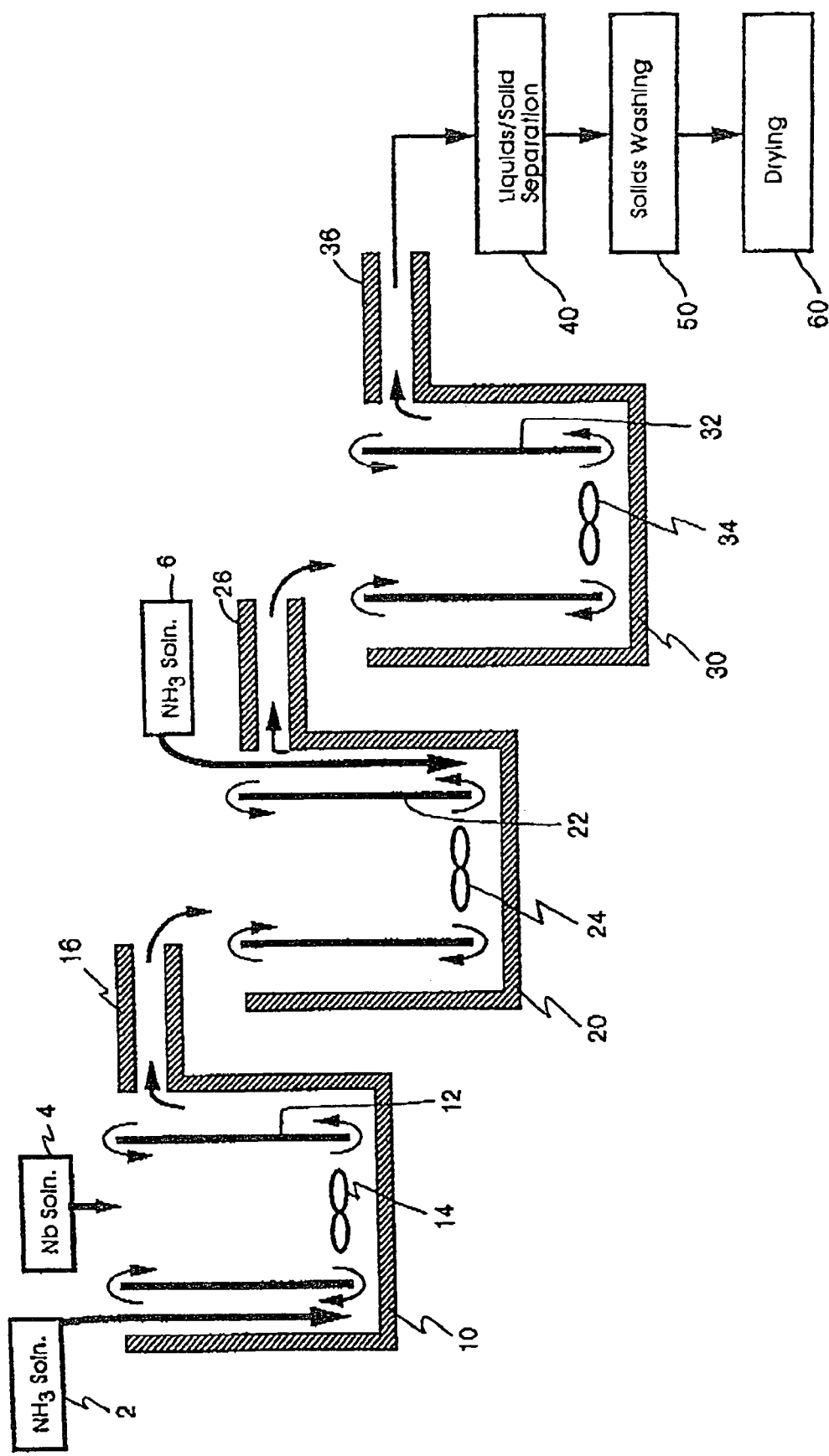
FIG. 1 depicts a possible reactor system for carrying out a preferred process of the present invention.
Figure 3A:
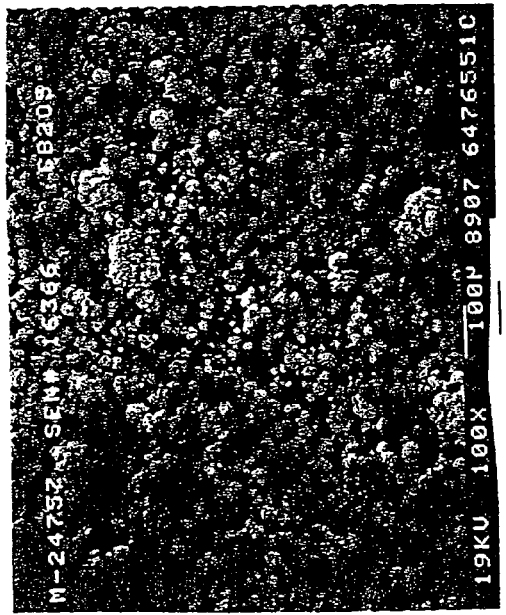
FIGS. 3a, 3b, 3c and 3d are SEM photographs of a calcined niobium pentoxide powder of the present invention produced in the manner described in Example 5 below.
Figure 3B:
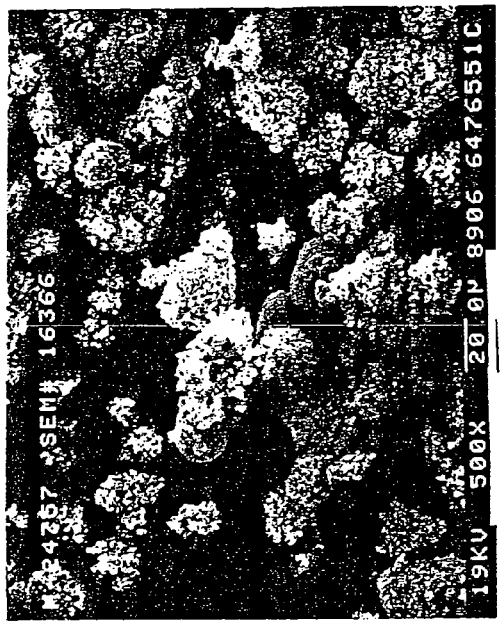
Figure 3C:
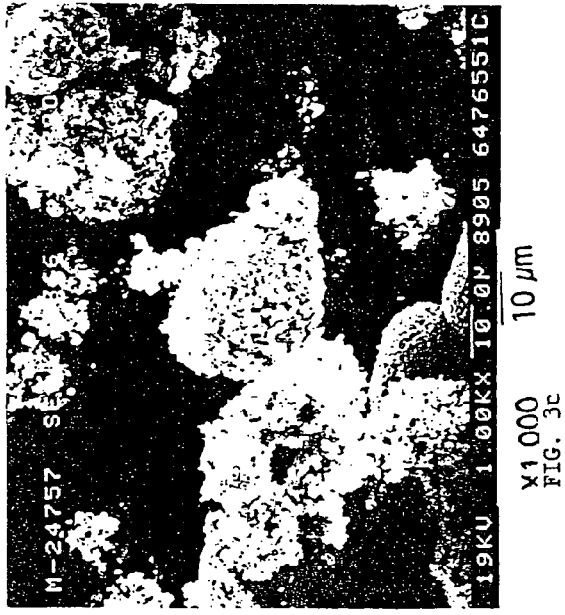
Figure 3D:
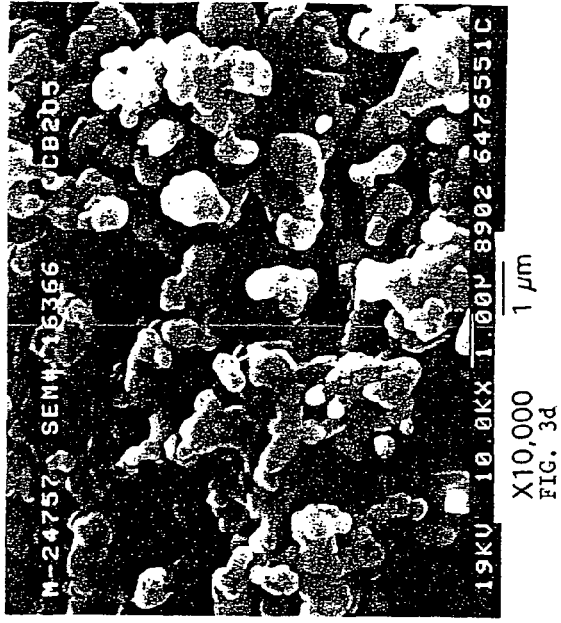
Figure 4B:
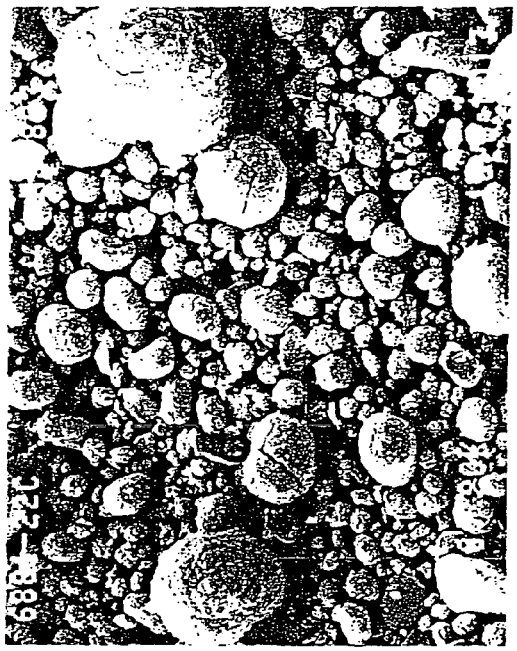
FIGS. 4a, 4b, 4c and 4d are SEM photographs of a calcined tantalum pentoxide powder of the present invention produced in the manner described in Example 9 below.
Figure 4D:
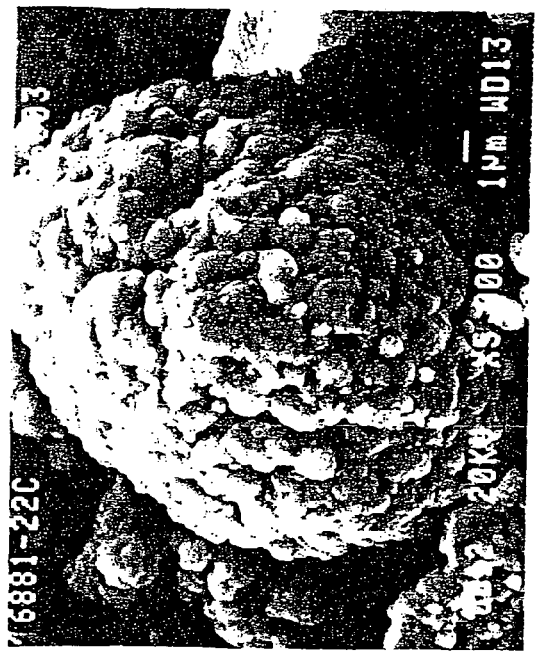
Figure 4A:
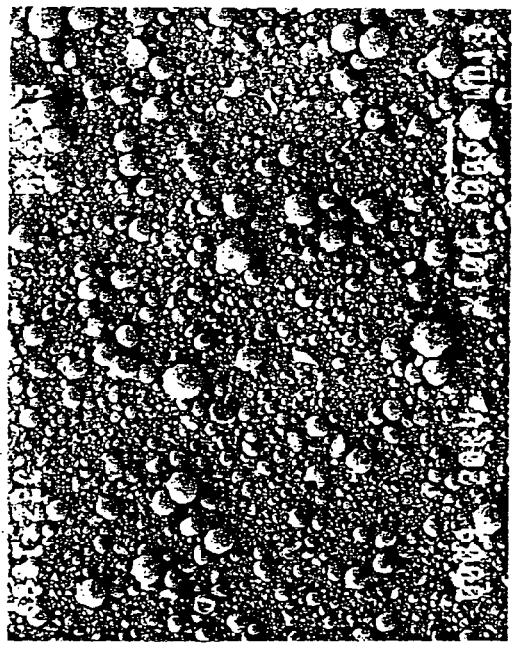
Figure 4C:
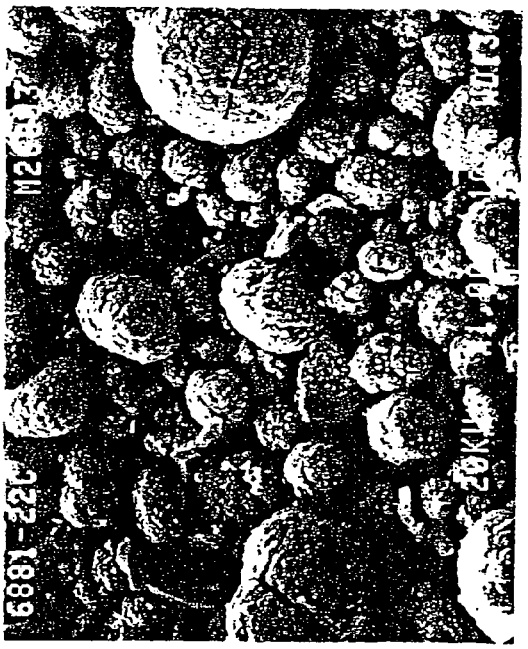
Figure 5A:
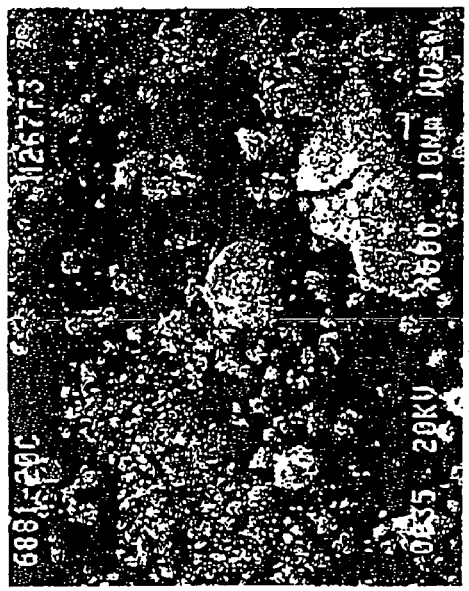
FIGS. 5a, 5b, 5c and 5d are SEM photographs of a calcined tantalum pentoxide powder of the present invention produced in the manner described in Example 10 below.
Figure 5B:
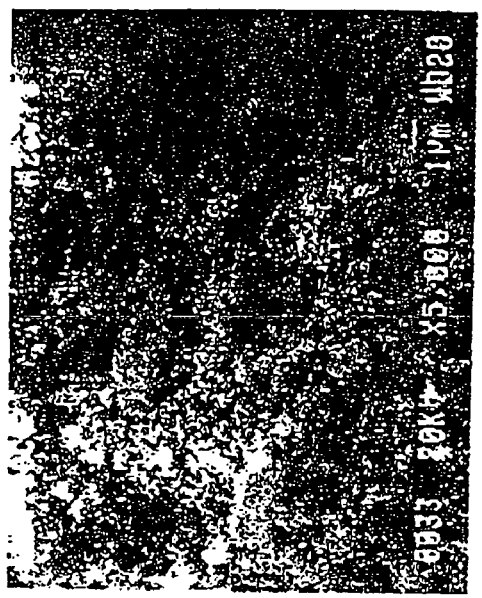
Figure 5C:
Figure 5D:

As set forth above, the present invention provides a process for producing valve metal oxides, such as tantalum pentoxide or niobium pentoxide. The process of the present invention may be advantageously utilized to produce valve metal pentoxides with a narrow particle size distribution within a desired particle size range and with low residual fluoride content.

As set forth above, in heretofore utilized processes for producing tantalum pentoxides/hydrates and niobium pentoxides/hydrates it has been difficult to control the particle size and the particle size distribution of the pentoxides and hydrates produced. While not wishing to be bound by any theory, this difficulty is believed to result, in part, because in a conventional process, tantalum pentoxide particles, or niobium pentoxide particles, are precipitated over a range of pH's. In conventional processes, tantalum pentoxide, or niobium pentoxide, is precipitated from an aqueous solution through the addition of ammonia to the solution. The addition of ammonia raises the pH of the solution, however the rise in pH occurs over time as the ammonia reacts with the solution. It is believed that the precipitation of tantalum pentoxide, or niobium pentoxide, begins at a first pH and continues as the pH continues to rise, and ends at a pH higher than the first pH The pH at which precipitation occurs affects the particle size of the precipitates, and thus it is believed that as precipitation occurs over a range of pH's, different particle size precipitates (tantalum pentoxides or niobium pentoxides) are produced, thereby increasing the particle size distribution. The precipitation over a wide range of pH also makes it difficult to produce tantalum pentoxides, or niobium pentoxides, of a particular particle size, particularly in a batch process.

We have discovered that this problem, and other disadvantages of the prior art processes, may be overcome by the process of the present invention. According to the process of the present invention, the solvent extracted valve metal fraction from digestion of valve metal containing ore is processed under controlled temperature, pH and residence time conditions to produce the valve metal pentoxide. More particularly, according to a preferred embodiment of the present invention, a process for producing a valve metal pentoxide comprises:

reacting an aqueous fluoro-solution comprising a valve metal-fluoro compound with an ammonia containing solution under controlled temperature, pH and residence time conditions to precipitate valve metal pentoxide precursor; and converting the valve metal pentoxide precursor to valve metal pentoxide; and separating and recovering the valve metal pentoxide.

With reference to the valve metal tantalum, a process for producing tantalum pentoxide comprises:

reacting an aqueous fluoro-solution comprising a tantalum-fluoro compound with an ammonia containing solution under controlled temperature, pH and residence time conditions to precipitate tantalum pentoxide precursor; and converting the tantalum pentoxide precursor to tantalum pentoxide; and separating and recovering the tantalum pentoxide. Product purity may be controlled by the purity of the valve metal fraction fed into the system. Complexing agents, such as EDTA (ethylenediaminetetraacetic acid) and the like, may be added to the aqueous fluoro-solution to aid in retaining impurities in solution.

Similarly, according to the present invention, a process for producing niobium pentoxide comprises:

reacting an aqueous fluoro-solution comprising a niobium-fluoro compound with an ammonia containing solution under controlled temperature, pH and residence time conditions to precipitate niobium pentoxide precursor; and converting the niobium pentoxide precursor to niobium pentoxide; and separating and recovering the niobium pentoxide. Product purity may controlled by the purity of the valve metal fraction fed into the system. Complexing agents, such as those listed above may be added to the aqueous fluoro-solution to aid in retaining impurities in solution.

As used herein, an aqueous fluoro-solution is a solution which includes fluorine ions.

A preferred method for controlling the reaction temperature, pH, and residence time is through the use of a cascading draft tube reactor system wherein the reaction between the valve metal fluoro compound, e.g., a tantalum-fluoro compound or niobium-fluoro compound, and the ammonia is begun in a first reaction vessel at a first pH and temperature, and then continues through one or more additional reaction vessels which may be maintained at different pH's and/or different temperatures. Thus, according to a preferred method of the present invention, a process for producing a valve metal pentoxide comprises:

introducing an aqueous fluoro-solution comprising a valve metal-fluoro compound into a first vessel maintained at a first temperature;

introducing a first ammonia solution into the first vessel and mixing the first ammonia solution and the aqueous fluoro-solution to obtain a first mixture at a first pH to react the first ammonia solution and the aqueous fluoro-solution and initiate precipitation of valve metal pentoxide precursor;

transferring said first mixture into a second vessel maintained at a second temperature and a second pH to produce a second mixture and mixing to continue precipitation of valve metal pentoxide precursor;

converting the valve metal pentoxide precursor to valve metal pentoxide; and separating and recovering the valve metal pentoxide. In the process of the present invention the first pH (in the first vessel) and the second pH (in the second vessel) may be substantially the same or different, and may be controlled independently. If desired, the second pH may be controlled by the step of introducing a second ammonia solution into the second vessel and mixing the second ammonia solution and the first mixture to react the first mixture and the second ammonia solution obtain the second mixture at the second pH.

A process for producing tantalum pentoxide comprises:

introducing an aqueous fluoro-solution comprising a tantalum-fluoro compound into a first vessel maintained at a first temperature;

introducing a first ammonia solution into the first vessel and mixing the first ammonia solution and the aqueous fluoro-solution to obtain a first mixture at a first pH and to react the first ammonia solution and the aqueous fluoro-solution and initiate precipitation of tantalum pentoxide precursor;

transferring said first mixture into a second vessel maintained at a second temperature and a second pH to produce a second mixture and mixing to continue precipitation of tantalum pentoxide precursor;

converting the tantalum pentoxide precursor to tantalum pentoxide; and separating and recovering the tantalum pentoxide. More preferably, the process includes the additional step of transferring said second mixture into a third vessel maintained at a third temperature and further mixing the second mixture to complete precipitation of tantalum pentoxide precursor prior to converting the tantalum pentoxide precursor to tantalum pentoxide. Where it is desired to further control the second pH, the process may also include the additional step of introducing a second ammonia solution into the second vessel and mixing the second ammonia solution and the first mixture to obtain the second mixture at the second pH and to react the first mixture and the second ammonia solution to continue precipitation of tantalum pentoxide precursor.

Similarly, a preferred method for producing niobium pentoxide comprises:

introducing an aqueous fluoro-solution comprising a niobium-fluoro compound into a first vessel maintained at a first temperature;

introducing a first ammonia solution into the first vessel and mixing the first ammonia solution and the aqueous fluoro-solution to obtain a first mixture at a first pH and to react the first ammonia solution and the aqueous fluoro-solution and initiate precipitation of niobium pentoxide precursor;

transferring said first mixture into a second vessel maintained at a second temperature and a second pH to produce a second mixture and mixing to continue precipitation of niobium pentoxide precursor;

converting niobium pentoxide precursor to niobium pentoxide; and separating and recovering the niobium pentoxide.

More preferably, the process includes the additional step of transferring said second mixture into a third vessel maintained at a third temperature and further mixing the second mixture to complete precipitation of niobium pentoxide precursor prior to converting the niobium pentoxide precursor to niobium pentoxide. Where it is desired to further control the second pH, the process may also include the additional step of introducing a second ammonia solution into the second vessel and mixing the second ammonia solution and the first mixture to obtain the second mixture at the second pH and to react the first mixture and the second ammonia solution to continue precipitation of niobium pentoxide precursor.

Although in each of the foregoing descriptions, introduction of the aqueous fluoro-solution is listed before introduction of the ammonia solution into the first vessel, either solution may be introduced first into the vessel. In addition, although a first and a second reaction vessel have been described in each description, additional reaction vessels may be utilized to further control the process. For example, two reaction vessels, maintained at slightly different pH's could be substituted for the first and/or the second vessel, thereby raising the total number of reaction vessels to four or five.

The valve-metal pentoxide precursor will generally comprise a valve-metal pentoxide hydrate. Conversion from valve-metal pentoxide precursor to valve metal pentoxide may be accomplished by calcining or by a hydrothermal process. Tantalum-oxide precursors may be converted to tantalum pentoxide by calcining at temperatures greater than, or equal to, 790° C. Niobium-oxide precursors may be converted to niobium pentoxide by calcining at temperatures greater than, or equal to, 650° C.

The residence time for the reactions in each vessel may be controlled by controlling the rate at which solutions are introduced into and transferred from the vessel. Control of the residence time impacts particle size and density. Increased residence time increases particle size and density. Temperature can also impact particle size, higher temperatures tend to speed precipitation reaction and generate finer particles.

In the preferred methods of the present invention, controlling the pH and temperature of each vessel allows the production of valve metal pentoxides (e.g, tantalum or niobium pentoxides), having desired particle sizes and narrow particle size distributions to be produced. In the process of the present invention pH may be controlled by controlling the addition of ammonia. The first pH (the pH in the first vessel) should be maintained at a level sufficient to initiate precipitation of the tantalum or niobium pentoxide product. Generally the first pH should range from 6 to 9.5, preferably from 7 to 8 for agglomerated particles. The second pH (the pH in the second vessel) should most preferably be maintained at a level sufficient to assure substantially complete precipitation of the tantalum or niobium pentoxide precursor. Generally the second pH should range from 8 to 9.5, preferably from 8 to 8.5. When the first pH in the first reaction vessel is towards the acidic side, addition of the second ammonia solution in the second vessel may be necessary to achieve the desired second pH. In a preferred three vessel embodiment of the process of the present invention, no additional ammonia is added in the third vessel, and the pH of the third vessel will be substantially the same as, or slightly less than, the pH in the second vessel thus assuring that the precipitation reactions proceed to substantial completion.

The choice of pH for each vessel will determine, in part, the particle size of the pentoxide product produced by the process. In general, the extremes of pH, i.e. near 6 and 9.5, in the first vessel are advantageous for producing fine particle sizes, with pH's in the middle of the range, i.e. near 7.5 advantageous for producing substantially spherical (coarse) particle sizes.

As used herein, residence time refers to the time period in which a reaction or reactions is/are occurring. Total or overall residence time for the process is the sum of the residence time in each reaction vessel. The minimum residence time for the process is a residence time sufficient to precipitate a valve metal pentoxide precursor. The maximum residence time for the process will generally be dictated by the desired product and the economics of the process. In general, for given pH's and temperatures, shorter total residence times are desirable for producing fine particle size and longer total residence times are desirable for producing coarse substantially spherical particle sizes. It is also advantageous for the total residence time to be the shortest time for a given temperature and pH(s) which allows substantially complete conversion of the valve metal-fluoro compound to the desired valve metal pentoxide precursor. As will be understood by those of ordinary skill in the art, longer residence times may be achieved by recycling of the solids phase.

The temperature of the reaction vessels may be controlled by conventional means including water jackets and the like. Generally, for large scale production, the temperature of each vessel will range from 40° C. to 95° C. For given pH's and residence times, higher temperatures will produce finer particles and lower temperatures will produce coarser particles.

The relationship between pH, temperature and residence time, may be generally summarized as follows:

| Particle Size | Total Residence Time | Temperature | First pH | Second pH |
|---|---|---|---|---|
| Fine | Shorter | Higher | >8 or <7 | 8-9.5 |
| Coarse | Longer | Lower | 7-8 | 8-9.5 |

This table is provided by way of illustration only, and is not meant, nor should be construed, to limit the scope of the process of the present invention.

An advantage of the process of the present invention is that the process may be utilized to produce valve metal pentoxide products of a desired particle size with a narrow particle size distribution.

Another advantage of the process of the present invention is that the process may be performed in a continuous manner, thereby providing a continuous process for producing valve metal pentoxides, such as tantalum pentoxide or niobium pentoxide, with a narrow particle size distribution within a desired particle size range.

A further advantage of the process of the present invention is that the process may be utilized to produce valve metal pentoxide products of a coarse substantially spherical particle size with high bulk density or fine particles of low bulk density.

A further advantage of the process of the present invention is that the process may be utilized to produce a wide range of high purity valve metal pentoxide products. Operating at elevated temperatures shifts the following reactions to the right, thus promoting completion of the following reactions to product:

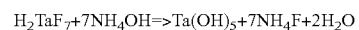

$$H_2TaF_7 + 7NH_4OH \Rightarrow Ta(OH)_5 + 7NH_4F + 2H_2O$$

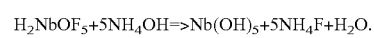

$$H_2NbOF_5 + 5NH_4OH \Rightarrow Nb(OH)_5 + 5NH_4F + H_2O.$$

Further details relating to the process of the present invention will become apparent to those of ordinary skill in the art from the following discussion of a preferred embodiment of the present invention depicted in FIG. 1, which is a process for producing niobium pentoxide products.

With reference to FIG. 1, a cascading draft tube reactor system suitable for carrying out a preferred embodiment of the present invention comprises a series of reaction vessels, with draft tubes, and circulation means (stirring means), all shown in cross-sectional view in FIG. 1. Reaction vessels, draft tubes, and circulation means suitable for use in the process of the present invention are commercially known, and therefore are not described in detail herein. Moreover, the process of the present invention is not limited to being performed by particular equipment, and may be performed by a wide variety of different equipment suitable for carrying out the process steps described above and below.

In a preferred process of the present invention, the niobium containing fraction 2 from digestion and separation of a niobium containing ore is added to the top center of a first reaction vessel 10. The rate of addition of the niobium containing fraction 2 will depend on the size of the reaction vessel, the desired residence time for the reactions occurring in the vessel, and the rate at which the first mixture is transferred out of the vessel. This can be any level, e.g., depending upon the type of particles desired.

An ammonia solution 4 is added to the bottom outer periphery of the first reaction vessel 10 outside the area defined by draft tube 12. The rate of addition of the ammonia solution 4 will also depend on the size of the reaction vessel, the desired residence time for the reactions occurring in the vessel, and the rate at which the first mixture is transferred out of the vessel. In addition, the rate of addition of the ammonia solution 4 will depend on the desired pH of the first mixture, $pH_1$. The pH of the first mixture, $pH_1$, is determined, in part, by the particle size desired in the final product. Generally, $pH_1$ ranges from 6 to 9.5. For a given temperature and residence time, $pH_1$ values near the extremes of the range (near 6 or 9) will produce a finer particle size in the final product while $pH_1$ values near the center of the range (between 7 and 8) will produce a coarse spherical particle size in the final product.

The first reaction vessel 10 is maintained at a first temperature, $T_1$. The temperature $T_1$ of the first vessel is determined, in part, by the particle size desired in the final product. Generally, $T_1$ ranges from 30 to 95° C., and preferably from 50 to 70° C. For a given pH and residence time, higher values for $T_1$ will result in final product having finer particle sizes. A water jacket (not shown in FIG. 1), or other means known to the art, may be utilized to maintain the first reaction vessel a $T_1$.

Circulation means 14 are utilized to circulate and mix the niobium containing fraction 2 and the ammonia solution 4 within reaction vessel 10 to create a first mixture. The direction of flow of the first mixture within the first reaction vessel may be as shown by the arrows.

During circulation, a portion of the first mixture will exit the first reaction vessel through pipe 16. The residence time for the reactions occurring in the first mixture may be controlled by varying the throughput rate, and/or the height and size of the reactor. The residence time of the first mixture in the first reaction vessel, $R_1$, will determine, in part, the density of the final product. Thus, by varying $R_1$ different density products may be produced. Generally $R_1$ will range from 0.03 hours (1.8 minutes) to 2.0 hours (120 minutes), and preferably from 0.2 hours (12 minutes) to 1.5 hours (90 minutes). For a given $pH_1$ and $T_1$, higher values for $R_1$ will result in a final product having packed bulk densities of 1.2 g/cc or more.

The portion of the first mixture that exits the first reaction vessel 10 through pipe 16 is introduced into the inner periphery of a second reaction vessel 20 inside the area defined by draft tube 22. The rate of addition of the first mixture into the second reaction vessel 20 will depend on the rate at which the first mixture is transferred out of the first reaction vessel 10.

An ammonia solution 6 is added to the outer periphery and near the bottom of the second reaction vessel 20 outside the area defined by draft tube 22. The rate of addition of the ammonia solution 6 will depend upon the size of the second reaction vessel, the desired residence time for the reactions occurring in the second reaction vessel, and the rate at which the first mixture is transferred into the second reaction vessel. In addition, the rate of addition of the ammonia solution 6 will depend on the desired pH of the second mixture, $pH_2$. The pH of the second mixture, $pH_2$, is determined, in part, by the particle size desired in the final product. Generally, $pH_2$ ranges from 8 to 9.5, depending upon the pH of the first reactor. For a given temperature and residence time, $pH_2$ values are selected to assure complete reaction while limiting the amount of ammonia consumed.

The second reaction vessel 20 is maintained at a second temperature, $T_2$. The temperature $T_2$ of the second vessel is determined, in part, by the density of particles desired in the final product and the rate of reaction. Generally, $T_2$ ranges from 30 to 95° C., preferably 60 to 85° C. For a given pH and residence time, higher values for $T_2$ will result in final product with a finer particle size. A water jacket (not shown in FIG. 1), or other means known to the art, may be utilized to maintain the second reaction vessel at $T_2$.

Circulation means 24 are utilized to circulate and mix the first mixture entering the second reaction vessel and the ammonia solution 6 within reaction vessel 10 to create a second mixture. The direction of flow of the second mixture within the second reaction vessel is shown by the arrows. Reversal of flow can effect particle characteristics depending on desired products.

During circulation, a portion of the second mixture will exit the second reaction vessel through pipe 26. The residence time for the reactions occurring in the second mixture may be controlled by varying the circulation rate and the height and size of the reactor. The residence time and temperature of the second mixture in the second reaction vessel, $R_2$, will determine, in part, the completion of reaction within the second vessel. To some degree it allows further precipitating and densification of the particles. Thus, by varying $R_2$, different particle size products may be produced. Generally $R_2$ will range from 0.03 hr (1.8 minutes) to 1.5 hr (90 minutes), preferably from 0.05 hour (3 minutes) to 0.8 hour (48 minutes). For a given $pH_2$ and $T_2$, higher values for $R_2$ will result in final product having denser and coarser particles.

The portion of the second mixture that exits the second reaction vessel 20 through pipe 26 is introduced into the inner periphery of a third reaction vessel 30 inside the area defined by draft tube 32. The rate of addition of the second mixture into the third reaction vessel 30 will depend on the rate at which the second mixture is transferred out of the second reaction vessel 20.

Circulation means 34 are utilized to circulate and continue mixing of the second mixture in the third reaction vessel to allow the precipitation of niobium pentoxide to proceed to substantial completion. The direction of flow of the second mixture within the third reaction vessel is shown by the arrows but is not a limiting characteristic of the reaction. Because no additional ammonia is added to the third reaction vessel, the pH of the mixture in the third reaction vessel, $pH_3$, will be slightly less than $pH_2$ depending upon the degree of reaction completion in the third reaction vessel along with ammonia volatilization rates.

The third reaction vessel 30 is maintained at a third temperature, $T_3$. The temperature $T_3$ of the third vessel is determined, in part, by the degree of reaction completion desired in the vessel. Generally, $T_3$ ranges from 40 to 95° C., preferably 60 to 85° C. For a given pH and residence time, higher values for $T_3$ will result in final product reaction being essentially complete. A water jacket (not shown in FIG. 1), or other means known to the art, may be utilized to maintain the third reaction vessel at $T_3$.

During circulation, a portion of the mixture will exit the third reaction vessel through an exit pipe 36. The residence time for the reactions occurring in the third reaction vessel may be controlled by varying the circulation rate and size of the reaction vessel.

The residence time of the mixture in the third reaction vessel, $R_3$, will determine, in part, the completion of reaction to the final product. Thus, by varying $R_3$, different degrees of reaction may be produced. Generally $R_3$ will range from 0.03 hr (1.8 minutes) to 1.5 hr (90 minutes), preferably from 0.05 hr (3 minutes) to 0.8 hr (48 minutes). For a given $pH_3$ and $T_3$, higher values for $R_3$ will result in final product having denser particles.

The solution exiting the third reaction vessel 30 through exit pipe 36 travels to conventional processing equipment wherein the precipitated niobium pentoxide solids are recovered from the solution by liquid/solids separation step 40. The liquid/solids separation step may be performed in any manner known to the art, such as by filtering. Preferably the liquid/solids separation step is performed by a vacuum or pressure filter.

As will be understood by those of ordinary skill in the art, the overall residence time, or the residence time in a reaction vessel may be increased by recycling all, or a portion of, the solution and/or solids exiting each vessel. In particular, an effective way of increasing overall residence time would be to recycle all or a portion of the precipitated solids formed by the process back into the initial vessel. Where recycling is utilized, the effective residence times in each vessel, and/or the effective overall residence time, may be greater than those set forth above for at least a portion of the reacting solution.

After separation of the niobium pentoxide solids, the solids which are not recycled may be washed as shown by solids washing step 50. Solids washing may be accomplished in manners conventional in the art, such as by washing with ammoniated water at a pH of about 9.0.

After washing, the solids are dried, as shown by drying step 60. The resulting product is a niobium pentoxide hydrate powder having a narrow particle size distribution and a desired particle size. Calcination of the niobium pentoxide hydrate converts it to niobium pentoxide, $Nb_2O_5$.

It should be noted that although the foregoing description describes a preferred process for producing a niobium pentoxide product, a similar process may be utilized for producing other valve metal pentoxide products, such as tantalum pentoxide products. Moreover, although the addition of materials and reagents has been described with reference to particular portions of the reaction vessels, the materials and reagents may be added to alternative portions of the reaction vessels in order to produce pentoxide products with different characteristics. For example, in the first reaction vessel, the niobium containing fraction 2, may be added to the inner periphery of the vessel and the ammonia solution added to the outer periphery of the vessel. It should further be understood that although the foregoing embodiment utilizes three reaction vessels, the process of the present invention may be conducted utilizing a fewer number or greater number of reaction vessels, depending on the characteristics desired in the final product. Although the foregoing embodiment of the reaction utilizes the mixing and flows as shown, reverse flows may be used as well. Furthermore, a portion of the solids discharged from the third reactor may be recycled to coarsen and densify the particles as desired.

The present invention also provides new valve-metal pentoxide powders:

A first embodiment of calcined niobium pentoxide powders of the present invention may be characterized by having:
  a BET surface area $\leq 6$ m$^2$/g, preferably $\leq 3$ m$^2$/g, more preferably $\leq 1$ m$^2$/g; and
  a packed bulk density of >1.8 g/cc, preferably $\geq 2.1$ g/cc.

The first embodiment of calcined niobitum pentoxide powders may be further characterized as comprising substantially spherical particles.

A second embodiment of calcined niobium pentoxide powders of the present invention may be characterized by having:
  a BET surface area of $\geq 2$ m$^2$/g, preferably $\geq 4$ m$^2$/g, more preferably $\geq 6$ m$^2$/g; and
  a packed bulk density of $\leq 1.8$ g/cc, preferably $\leq 1.0$ g/cc, more preferably $\leq 0.75$ g/cc.

A first embodiment of calcined tantalum pentoxide powders of the present invention may be characterized by having:
  a BET surface area of $\leq 3$ m$^2$/g, preferably $\leq 0.75$ m$^2$/g, more preferably $\leq 0.4$ m$^2$/g; and
  a packed bulk density of >3.0 g/cc, preferably $\geq 3.8$ g/cc, more preferably $\geq 4.0$ g/cc.

The first embodiment of calcined tantalum pentoxide powders may be further characterized as comprising substantially spherical particles.

A second embodiment of calcined tantalum pentoxide powders of the present invention may be characterized by having:
  a BET surface area of $\geq 3$ m$^2$/g, preferably $\geq 7$ m$^2$/g; more preferably $\geq 11$ m$^2$/g, and
  a packed bulk density of $\leq 3.0$ g/cc, preferably $\leq 1.1$ g/cc, more preferably $\leq 0.75$ g/cc.

The first and second embodiments of niobium pentoxide products of the present invention may be generally characterized by the following combination of analytical properties:

| | |
|---|---|
| Size: | 70% less than 1 micrometer to <1% less than 1 micrometer |
| Morphology: | fine single crystallites to coarse substantially spherical agglomerates |
| BET Surface Area: | 0.50 m$^2$/g to 50 m$^2$/g — uncalcined 0.50 m$^2$/g to 6 m$^2$/g — calcined |
| Packed Bulk Density: | 0.5 g/cc to 2.1 g/cc; | wherein the first embodiment of niobium pentoxide products is further characterized by having

| | |
|---|---|
| Size: | <1% less than 1 micrometer |
| Morphology: | large substantially spherical agglomerates |

-continued

| | |
|---|---|
| BET Surface Area: | 0.5 m²/g to 3 m²/g — uncalcined |
| | 0.5 m²/g to 2 m²/g — calcined |
| Calcined Packed Bulk Density: | 1.8 g/cc to 2.1 g/cc; | and wherein the second embodiment of niobium pentoxide products is further characterized by having

| | |
|---|---|
| Size: | 70% less than 1 micrometer |
| Morphology: | fine crystallites |
| BET Surface Area: | 3 m²/g to 50 m²/g — uncalcined |
| | 2 m²/g to 6 m²/g — calcined |
| Packed Bulk Density: | 1.0 g/cc to 1.8 g/cc. |

The first and second embodiments of tantalum pentoxide products of the present invention may be generally characterized by the following combination of analytical properties:

| | |
|---|---|
| Size: | 70% less than 1 micrometer to <1% less than 1 micrometers |
| Morphology: | fine single crystallites to large substantially spherical agglomerates |
| BET Surface Area: | 0.3 m²/g to 17 m²/g — uncalcined |
| | 0.3 m²/g to 11 m²/g — calcined |
| Calcined Packed Bulk Density: | 0.9 to 4.0 g/cc | wherein the first embodiment of tantalum pentoxide products is further characterized by having

| | |
|---|---|
| Size: | substantially all >1 micrometer |
| Morphology: | large substantially spherical agglomerates |
| BET Surface Area: | 0.3 m²/g to 3 m²/g — uncalcined |
| | 0.3 m²/g to 3 m²/g — calcined |
| Calcined Packed Bulk Density: | 2 g/cc to 4 g/cc; | and wherein the second embodiment of tantalum pentoxide products is further characterized by having

| | |
|---|---|
| Size: | >9% less than 1 micrometer |
| Morphology: | fine crystallites |
| BET Surface Area: | 3 m²/g to 17 m²/g — uncalcined |
| | 1.8 m²/g to 11 m²/g — calcined |
| Calcined Packed Bulk Density: | 1.1 g/cc to 3.0 g/cc. |

The products of the present invention may be advantageously produced, for example, by the process of the present invention.

An advantage of the products of the present invention is that the products of high purity can be obtained. The fine particles produced by the present invention are highly reactive for use as dopants in various applications, such as electronics, ceramics, and as catalysts. The large dense spherical agglomerated particles have exceptional rheology and can be used for thermite (thermal reduction processes with active metals, i.e., aluminum) or glass applications. The large spherical particles blend well upon mixing with other glass forming ingredients. Furthermore, the large dense particles are not readily airborne in high gas flow streams, thus resulting in high melt efficiencies. Other applications for thermiting, for example, result in the large dense spherical particles giving greater packing factors, thus large thermite batches and greater productivity. In addition, the large, dense particles are not readily airborne during the thermite reaction, thus resulting in greater product recoveries.

In addition, the present invention provides new valve metal pentoxide precursors, in particular new niobium pentoxide precursors and new tantalum pentoxide precursors. The valve metal pentoxide precursors of the present invention may be processed to produce advantageous valve metal pentoxide products.

The valve metal pentoxide precursors of the present invention are characterized by having a line broadened d-value under x-ray analysis at:
6±0.3;
3±0.2; and
1.8±0.1.

Figure 7:
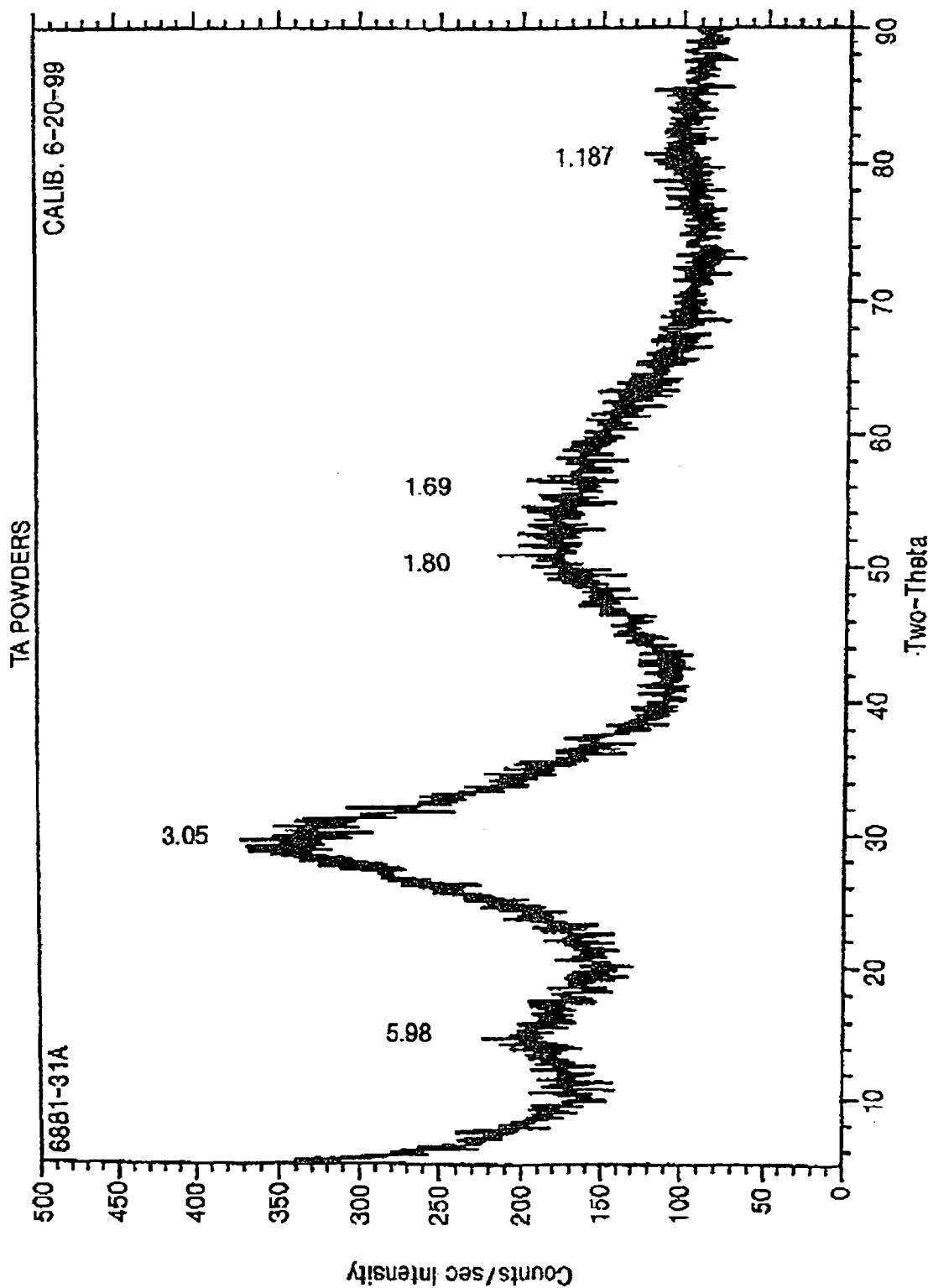
FIG. 7 is an example of a graph of x-ray d-value for a valve metal pentoxide precursor of the present invention.

FIG. 7 is an example of the type of line broadened d-value graph which may be generated by a valve metal pentoxide precursor of the present invention under x-ray analysis. FIG. 7 is provided by way of example only and should not be construed as limiting the scope of the valve metal pentoxide precursors of the present invention.

A first embodiment of niobium pentoxide precursors of the present invention may be further characterized by having a BET surface area of $\leq 3$ m²/g, preferably $\leq 0.5$ m²/g and a Fluoride content of $\leq 500$ parts per million (ppm), preferably $\leq 150$ ppm.

A second embodiment of niobium pentoxide precursors of the present invention may be further characterized by having a BET surface area of >3 m²/g, preferably $\geq 50$ m²/g and a Fluoride content of $\leq 500$ ppm, preferably $\leq 150$ ppm.

A first embodiment of tantalum pentoxide precursors of the present invention may be further characterized by having a BET surface area of $\leq 3$ m²/g, preferably $\leq 0.4$ m²/g and a Fluoride content of $\leq 500$ ppm, preferably $\leq 150$ ppm.

A second embodiment of tantalum pentoxide precursors of the present invention may be further characterized by having a BET surface area of >3 m²/g, preferably $\geq 17$ m²/g and a Fluoride content of $\leq 500$ ppm, preferably $\leq 150$ ppm.

The valve-metal pentoxide precursors of the present invention may be advantageously produced by the process of the present invention by separating the valve-metal pentoxide precursor prior to converting the precursor to a valve-metal pentoxide.

The following analytical procedures may be utilized in determining the analytical properties of the products of the present invention, and/or were utilized in the examples described herein.

B.E.T. Surface Area

B.E.T. surface area was determined according to Cabot test procedure WI-P008, revision number 3 (5/1995) by measuring the quantity of adsorbate gas adsorbed in a solid surface by sensing the changing in thermal conductivity of a flowing mixture of adsorbate and inert carrier gas utilizing a monosorb surface area analyzer Model No. MS-12 and a quantector outgassing unit. The procedure included the following:
  i) purging the gas cylinders for at least 5 minutes;
  ii) purging the instrument for 5 minutes;
  iii) adjusting gas flow pressure to position the float between 60 and 80;
  iv) warming up the instruments for 20-30 minutes;
  v) resetting the counter;

vi) calibrating the instruments by injecting 1.0 cc. of air into the septum on the front panel using the syringe. (The counter should begin operating in about 2 minutes. The air injection should yield a reading of 2.84±0.03. If the reading is greater than 2.87, increase the gas flow slightly. If the reading is less than 2.81, decrease the gas flow slightly.)
vii) verifying the calibration;
viii) weighing a sample to the nearest 0.0001 grams;
ix) placing the sample in a sample tube;
x) inserting the sample tube into a tube holder and inserting the tube holder into the outgas station;
xi) placing the heating mantle (150° C.) around the sample tube;
xii) collecting outgas sample for at least 20 minutes;
xiii) removing the sample tube and tube holder from the sample station;
xiv) removing the outgas sample from the outgas station;
xv) inserting the outgassed sample into the sample station;
xvi) depressing the "ADS" button under the signal meter;
xvii) zeroing the signal meter;
xviii) jacketing the outgassed sample tube with a Dewar flask 80-90% filled with liquid nitrogen;
xix) depressing the "DES" button after the signal meter returns to zero
xx) removing the Dewar flask and immediately immersing the sample in a beaker of room temperature (approximately 20° C.) water, (After approximately 1 minute, the desorption is complete, the signal meter will return to zero, and the counter will display a number which is the sample surface area in square meters.) and recording the displayed number;
xxi) removing and drying the sample tube; and
xxii) weighing the sample tube.

B.E.T. surface area is determined by the following calculations:

surface area m$^2$/g=Counts/(Total weight−Tare weight).

A control powder of known B.E.T. surface area is run to verify the accuracy of the procedure.

Flouride Content (Greater than or Equal to 50 ppm)

For samples having a fluoride content of greater than 50 ppm, fluoride content was determined utilizing Cabot Test Procedure W-108 "Determination of Fluoride in Tantalum Wet Method," revision number 1 (10/1992). The method provides for the determination of fluoride in tantalum in the range of 0.005 to 0.50 percent. Following alkaline fusion, fluoride is separated by volatilization as silicon tetrafluoride from a sulfuric acid solution. Fluoride content is determined in the distillate using a specific ion electrode. The procedure includes the following steps:
i) Transfering 1.000 grams of sample to a 100 ml nickel crucible.
ii) Adding 5.0 grams of KOH and mix.
iii) Covering and heating under low heat until the sample has completely turned milky white.
iv) Cooling and leaching the melt with 25 ml of deionized water.
v) Transfering the sample to the distillation flask containing a few glass beads.
vi) Placing a 600 ml beaker containing 30 ml of water, 5 drops of Bromothymol blue indicator and 3 ml of 30% sodium hydroxide under the condenser so that the condenser tip is immersed in the sodium hydroxide solution.
vii) Adding 80 ml of 1:1 sulfuric acid through the funnel and close the stopcock.
viii) Using a burner, gradually raising the temperature in the distillation flask to 140° C. and maintain this temperature within ±5° C. while passing steam from a steam generation flask containing DI water.
ix) Collecting about 400 ml of distillate and transfer to a 500 ml volumetric flask.
x) Diluting to 500 ml with DI water and mix.
xi) Transfering an aliquot containing between 5 and 50 μg of fluoride to a 150 ml beaker. Diluting to 50 ml with DI water and add 50 ml of buffer solution.
xii) Placing on a magnetic stirrer and mix at medium speed.
xiii) Immersing the electrodes in the solution for at least three minutes or until the reading has stabilized.
xiv) Recording the reading and calculating the μg of fluoride from the calibration curve.
xv) Calibration Curve:
Preparing a calibration curve by diluting the fluoride standard solution to the appropriate volumes to make 0.1 μg, 0.25 μg, 0.5 μg, and 1.0 μg/ml standards.

Flouride content is determined by the following calculation:

(μg/ml×500 ml)/(Sample Weight in Grams)=ppm flouride.

A control sample of known flouride content is run to verify the accuracy of the procedure.

Flouride Content (Less than or Equal to 50 ppm)

For samples having a fluoride concentration less than or equal to 50 parts per million, fluoride content was determined according to Cabot Test Method W-80 "Determination of Fluorine by Thorium Nitrate Titration Wet Method," revision number 2 (2/1993). In this method, fluorine is separated by volatilization as tetrafluorides from a sulfuric acid solution. The aqueous solution is titrated with the standard solution of thorium nitrate using alizarin sulfonate as an indicator in order to determine fluoride content. The procedure includes the following steps:
i) Taking appropriate sample weight or aliquot and transfer to an all glass distillation flask containing a few glass beads.
ii) Placing a 600 ml. beaker containing 30 ml. of water, 5 drops of Brom Thymol Blue indicator and 5.0 ml. of 30% sodium hydroxide under the condenser so that the condenser tip is immersed in the sodium hydroxide solution. (If necessary, add more NaOH to maintain blue color during the distillation.)
iii) Adding 80.1 ml. of 1:1 sulfuric acid through the funnel and close the stopcock.
iv) Using a burner, gradually raising the temperature in the distillation flask to 145° C. and maintaining this temperature within 5° while passing in steam from a steam generation flask containing distilled water.
v) Collecting about 400 ml. of distillate and transfer to a 500 ml. volumetric flask.
vi) Diluting to 500 ml. with water and transfering an aliquot containing 5 to 10 mg. of fluoride to a 150 ml white casserole.
vii) Adding 5 drops of indicator and then 5% acetic until the pink color is just discharged.

viii) Adding 3 ml. of buffer solution and titrating with thorium nitrate to a permanent pink color. (In order to get acquainted with the end point, it is good practice for the operator to titrate various amounts of fluorine made from a standard sodium fluoride solution containing 0.500 mg. fluoride/ml. The illumination should be the same for all titrations subsequent to the standardization.)

Flouride content is determined by running a blank and a flouride standard containing 5 mg of fluoride as outlined in steps (vi) to (viii), and then utilizing the following calculations:

$$\text{mg F sample} = \frac{(\text{mg F standard}) \times (\text{sample titration} - \text{blank titration})}{(\text{sample titration} - \text{blank titration})}$$

$$\text{g/l Flouride} = \frac{\text{mg fluoride sample}}{(10) \times (10/100) \times \text{aliquot from step (vi) of the procedure}}.$$

A control sample of known flouride content is run to verify the accuracy of the procedure.

Particle Size

Particle size was determined according to Cabot Test Procedure P-007 "Determination of Particle Size With a Micro-Trac II Physical Method," revision number 2 (11/1994). This procedure provides for the determination of particle size of powders using the principle of light scattering with a laser beam source in the range of 0.7 to 700 microns. The procedure includes the following steps:

i) Turning on the power to the computer, monitor and printer.
ii) Turning on the power to the Micro-Trac II unit.
iii) Draining and rinsing the re-circulator attached to the Micro-Trac II unit. Fill to ½ inch above the top of the return tube located inside the sample chamber using deionized water, approximately 240 ml.
iv) Turning the re-circulator switch on and off a few times to purge any air bubbles from the lines. Watching for a large bubble to rise from the small cavity at the bottom of the sample chamber.
v) Allowing the water to circulate for approximately one minute to remove entrained bubbles.
NOTE: Turning the switch on and off a few times helps remove the bubbles.
vi) From the computer menu, choosing Data Management System and press Enter and the F2 key for Data Collection.
vii) Pressing F9. This will cause primary keypad to be displayed. "Laser Align" will be highlighted. Aligning the laser, if necessary, by following the procedure outlined in the Micro-Trac Operators Manual.
viii) Selecting "Run Time" from the menu of the primary keypad. Setting run time to 30 seconds.
ix) Selecting "Set Zero" from keypad. Press Enter. Numbers will appear in two columns, Flux and Normalized Flux. Numbers should be progressively lower down both columns.
NOTE: If high background warning appears, try turning re-circulator switch on and off a few times.
x) When satisfactory numbers are obtained in step (ix), re-selecting "Run Time" from the keypad menu and resetting run time to 10 seconds.
xi) From the primary keypad screen, selecting F1 to return to DMS. Channel screen will appear.
xii) Pressing Ctrl and F3 simultaneously to obtain a blank run. Numbers should all be zeros. If all zeros do not appear, repeating steps (vii) through (xii) until all zeros from the blank run.
xiii) Pressing F9 to return to primary keypad.
xiv) Moving highlighter to Sample Loading and press Enter.
xv) Pressing F1 for Sample Loading.
xvi) Introducing sample slowly until loading index reads 0.86-0.90. Waiting 15 to 30 seconds to see that reading is stable.
xvii) Pressing Esc F1 which will return you to the channel screen. Pressing Control and F3 together to make sample run.
xviii) Checking upper channels to see that there are no false readings (i.e., no zeros between real numbers or readings in highest channels when majority of reading indicate a fine powder.
xix) If false reading occurs, repeating the prior two steps. If false readings appear a second time, dump sample and restart from step (vii).
xx) Moving cursor down to Sample ID and entering sample information.
xxi) Pressing F5 to save the results to the hard disk.
xxii) Pressing Print Screen to print a hard copy of the results.
xxiii) Opening drain valve, and shutting off re-circulator before chamber empties.
xiv) Rinsing 2-3 times with re-circulator running.
xv) Draining and refilling with deionized water.
xvi) Pressing F9 and proceeding from step (ix) for next sample to be analyzed.

A control powder, of known particle size distribution, is run to verify the accuracy of the procedure.

Bulk Density and Tap (Packed Bulk) Density

Bulk density and tap density (packed bulk density) were determined by weighing samples of the powders and measuring the volume of the samples before and after tapping. The tapping machine utilized was manufactured by German J. Engelsmann. The procedure included the following steps:

i) Taring a 25 ml glass graduated cylinder.
ii) Transfering, carefully, between 20 and 25 ml of the material to be tested to the graduate.
iii) Recording the weight of the sample.
iv) Recording the volume of the sample taking care not to pack down the sample.
v) Placing the cylinder under the ring of the tapping machine and secure it.
vi) Turning the switch of the instrument "ON." It will tap 5,000 times and shut off automatically.
vii) Removing the graduated cylinder and remeasuring the volume.

Bulk density was calculated by the following formula:

Bulk Density=Weight in Grams/Original Volume

A control sample of known bulk density is run to verify the accuracy of the procedure.

X-Ray Defraction (XRD)

X-ray defraction (XRD) data was produced utilizing procedures developed by Micron Inc., 3815 Lancaster Pike, Wilmington, Del. The data was produced utilizing a General Electric XRD-5 defractometer with a copper target tube and graphite monochromator, a scintillation detector with pulse height selection and a computer controlled step-scanning drive. The x-ray defraction system also included the following computer hardware and computer software:
- Digital Micro VAX-2000
- Falcon microprocessor for step-scanning control
- HP 7475A 6-color plotter for hard copy of scans
- Toshiba P321 printer for hard copy of print-outs
- Tektronix color graphics terminal
- Nicolet/Siemens I2 Polycrystalline Software Package (Version 2.41 June 1989). This software package uses the VMS operating system. The menu-driven program is for data collection, peak-picking (data reduction), search/match phase identification using the JCPDS data base, quantitative analysis and interactive graphics.

The data collection reduction and reporting procedures were as follows:

Data Collection Procedure:

Clean the goniometer sample holder prior to inserting the standard. Insert the standard into the sample holder and align the sample face parallel to the sample holder face. Small displacement of the sample face with respect to the sample holder face will cause the diffraction spectra to shift with respect to the theoretical 2 theta values. Run the diffraction scan of the Silicon standard using the parameters listed under "Instrument Operating Conditions" on page 1.

Data Reduction Procedures:

Measure the 2 theta values and intensities of the peaks at 28.443 degrees and at 88.032 degrees.

Data Reporting:

Record the measured values in the XRD calibration log. If the measured 2 theta values deviate more than 0.04 degrees 2 theta from the theoretical values or the intensities deviate more than 20% relative to the previous established values the laboratory supervisor must be advised and appropriate measures taken to correct the problem. An "Out of Specification" form must be made out, following the procedure outlined in SOPOOS. Samples that were analyzed during the discrepancy must be re-analyzed after the discrepancy has been corrected.

Morphology

Morphology of the samples may be determined by visual inspection utilizing scanning electron microscope photographs as necessary.

Other properties may be determined by procedures which, like the foregoing procedures, are well known and generally utilized in the art.

The effectiveness and advantages of various aspects and embodiments of the present invention will be further illustrated by the following examples.

EXAMPLES

General Description of Reaction Set-Up

The following set-up was utilized in Examples 1-10.

Three reaction vessels with accompanying hardware were utilized. The reactor train design and layout was substantially as depicted in FIG. 1.

Three 1500 ml (milliliter) plastic beakers were utilized as the first, second, and third reaction vessel. Working volume of the reactors was approximately 1000 ml. The plastic beakers were heated by hotplates in a double boiler type set-up using an outer container surrounding each beaker. Either water or Dowtherm®, a registered heat exchange product of Dow Chemical Co., was utilized in the outer containers for heat transfer and control depending on temperature requirements. In order to obtain a draft tube set-up, an inner tube with flights (or baffles) was utilized inside each beaker.

Variable speed marine propellers were utilized in the bottom of each beaker as circulation means and variable speed peristaltic pumps were utilized to control the feed rates of the niobium fraction and ammonia solution to the first two beakers (reactors).

Example 1

This example illustrates a laboratory scale embodiment of a preferred process of the present invention for making niobium pentoxide precursor, and a niobium pentoxide ($Nb_2O_5$) product of the present invention.

Reactor bath double boilers (filled with deionized (DI) water) were set to 98° C. A stock solution of niobium oxyfluoride (concentration of 210 g niobium pentoxide/liter) was preheated to about 76° C. and added to reactor one at an average rate of 18.5 ml/minute. Stock solution of 5N (7.8 wt. %) ammonia was added to reactor one at an average rate of 80.5 ml/minute. The reactants were agitated in the first reactor with a resultant average temperature and pH of 74° C. and 8.52, respectively. The resulting suspension flowed into the second and third reactors for further mixing. The reaction was run for 330 minutes, prior to collection of samples, for a total of approximately ten residence times, average residence time being 31 minutes.

Two liters of suspension were collected and filtered. The retained cake was washed and re-slurried with two liters of 5N ammonia solution at about 80° C. The resulting slurry was then filtered. The wash and filtration were repeated four more times. The resulting retained cake was dried for sixteen hours at 85° C.

The dried cake was then calcined at 900° C. for four hours. The uncalcined cake weighed 187 g (28.4% moisture) and contained 200 ppm fluoride. The calcined cake weighed 97.5 g containing 100 ppm fluoride and 90.9% of the material was below 1.5 microns in size (100% was below 24 microns).

The process conditions utilized and results obtained are also set forth in Table 1 below.

Example 2

This example illustrates a laboratory scale embodiment of a preferred process of the present invention for making niobium pentoxide precursor and a niobium pentoxide ($Nb_2O_5$) product of the present invention.

Reactor bath double boilers (filled with DI water) were set to 98° C. Stock solution of niobium oxyfluoride (concentration of 210 g niobium pentoxide/liter) was preheated to about 76° C. The niobium solution was added to the first reactor at an average rate of 13.1 ml/minute. Stock solution of 5N (7.8 wt. %) ammonia was also added to reactor one at an average rate of 98.2 ml/minute. These reactants were then agitated with a resultant average temperature and pH of 61° C. and 9.14, respectively.

The resulting suspension flowed into the second reactor where an additional 5.6 ml/minute of niobium oxyfluoride solution was added with agitation. The resultant average temperature and pH of reactor two were 73° C. and 8.28, respectively. The resulting suspension flowed into the third reactor for further mixing. The reaction was run for 315 minutes, prior to collection of samples, for a total of approximately eleven residence times, average residence time being 27 minutes.

Two liters of suspension were collected and filtered. The filtered cake was washed and re-slurried with two liters of 5N (7.8 wt. %) ammonia solution at about 85° C. The resulting slurry was then filtered. The wash and filtration were repeated four additional times. The resulting retained cake was dried for sixteen hours at 85° C. The dried cake was then calcined at 900° C. for four hours. The uncalcined cake weighed 223.5 g (44.3% moisture) and contained 460 ppm fluoride. The calcined cake weighed 85.8 g, containing 180 ppm fluoride and 73.5% of the material was larger than 96 microns in size.

The process conditions utilized and results obtained are also set forth in Table 1 below.

Example 3

This example illustrates a laboratory scale embodiment of a preferred process of the present invention for making niobium pentoxide precursor and a niobium pentoxide ($Nb_2O_5$) product of the present invention.

Reactor bath double boilers (filled with DI water) were set to 95° C. A stock solution of niobium oxyfluoride (concentration of 210 g niobium pentoxide/liter) was preheated to about 88° C. and added to reactor one at an average rate of 3.5 ml/minute. Stock solution of 5N (7.8 wt. %) ammonia was added to the first reactor at an average rate of 7.8 ml/minute. These reactants were agitated with a resultant average temperature and pH of 76° C. and 7.78, respectively. The resulting suspension flowed into the second reactor where an additional 15.6 ml/minute of ammonia stock solution was added with agitation. The resultant average temperature and pH of the second reactor were 68° C. and 8.48, respectively.

The resulting suspension flowed into the third reactor for further mixing. The reaction was run for 1100 minutes, prior to collection of samples, for a total of approximately ten residence times, average residence time being 115 minutes.

Two liters of suspension were collected and filtered. The filtered cake was washed and re-slurried with two liters of 5N (7.8 wt. %) ammonia solution at about 85° C. The resulting slurry was then filtered. The wash and filtration were repeated four additional times. The retained cake was then dried for sixteen hours at 85° C. The dried cake was then calcined at 900° C. for four hours. The uncalcined cake weighed 143.1 g (29.07% moisture) and contained 1400 ppm fluorine. The calcined cake weighed 71.5 g containing 200 ppm fluoride and 77.5% of the material fell between 8 and 32 microns in size (5.6% was below 8 microns).

The process conditions utilized and results obtained are also set forth in Table 1 below.

Example 4

This example illustrates a laboratory scale embodiment of a preferred process of the present invention for making niobium pentoxide precursor and a niobium pentoxide ($Nb_2O_5$) product of the present invention.

Reactor bath double boilers (filled with DI water) were set to 98° C. A stock solution of niobium oxyfluoride (concentration of 210 grams niobium pentoxide/liter) was preheated to about 72° C. and added to reactor one at an average rate of 19 ml/minute. Stock solution of 5N (7.8 wt. %) ammonia was also added to reactor one at an average rate of 34.3 ml/minute. These reactants were then agitated with a resultant average temperature and pH of 80° C. and 6.28, respectively.

The resulting suspension flowed into the second reactor where an additional 20.9 ml/minute of ammonia stock solution was added with agitation. The resultant average pH of reactor two was 8.46 (temperatures for reactor two were not recorded). The resulting suspension flowed into the third reactor for further mixing. The reaction was run for 375 minutes, prior to collection of samples, for a total of approximately nine residence times, average residence time being 42 minutes. Two liters of suspension were collected and filtered. The filtered cake was washed and re-slurried with two liters of 5N (7.8 wt. %) ammonia solution at about 85° C. The resulting slurry was then filtered. The wash and filtration was repeated four additional times. The resulting retained cake was dried for twenty hours at 90° C. The dried cake was then calcined at 900° C. for four hours. The uncalcined cake weighed 216.6 grams (49.9% moisture) and contained 3600 ppm fluoride. The calcined cake weighed 82.2 grams containing 300 ppm fluoride and 30.5% of the material was smaller than 1 micron in size.

The process conditions utilized and results obtained are also set forth in Table 1 below.

Example 5

This example illustrates a laboratory scale embodiment of a preferred process of the present invention for making niobium pentoxide precursor and a niobium pentoxide ($Nb_2O_5$) product of the present invention.

Reactor bath double boilers (filled with DI water) were set to 98° C. A stock solution of niobium oxyfluoride (concentration of 210 grams niobium pentoxide/liter) was preheated to about 75° C. and added to reactor one at an average rate of 56.5 ml/minute. Stock solution of 5N (7.8 wt. %) ammonia was also added to reactor one at an average rate of 210.4 ml/minute. These reactants were then agitated with a resultant average temperature and pH of 80° C. and 7.72, respectively.

The resulting suspension flowed into the second reactor where additional ammonia stock solution 5N (7.8 wt. %) was added with agitation to raise the pH of the resulting solution to 8.49 and the temperature to 70° C. The resulting suspension flowed into the third reactor for further mixing. The reaction was with an average residence time of 12 minutes.

Two liters of suspension were collected and filtered. The filtered cake was washed and re-slurried with two liters of 5N (7.8 wt %) ammonia solution at about 85° C. The resulting slurry was then filtered. The wash and filtration was repeated four additional times. The resulting retained cake was dried for 16 hours at 85° C. at 35.78% moisture. The dried cake was then calcined at 900° C. for four hours. The calcined cake contained 100 ppm fluoride with a packed bulk density of 1.02 g/cc and 28.4% was less than 1 micron in size.

The process conditions utilized and results obtained are also set forth in Table 1 below.

Example 6

This example illustrates a laboratory scale embodiment of a preferred process of the present invention for making tantalum pentoxide precursor and a tantalum pentoxide ($Ta_2O_5$) product of the present invention.

Reactor bath double boilers (filled with DOW thermal oil) were set to 160° C. Stock solution of fluorotantalic acid (concentration of 80 g tantalum pentoxide/liter) was preheated to about 67° C. and added to reactor one at an average rate of 30 ml/minute. Stock solution of 5N (7.8 wt. %) ammonia was added to the first reactor at an average rate of 50 ml/minute. The reactants were agitated with a resultant average temperature and pH of 67° C. and 9.01, respectively.

The resulting suspension flowed into the second reactor for further agitation with a resultant average temperature and pH of 72° C. and 8.73, respectively. The suspension flowed into the third reactor for further agitation with a resultant average temperature and pH of 78° C. and 8.42, respectively. The reaction was run for 180 minutes, prior to collection of samples, for a total of about five residence times, average residence time being 37.5 minutes.

Three liters of suspension were collected and filtered. The filtered cake was washed and re-slurried with two liters of 5N (7.8 wt. %) ammonia solution at about 85° C. The resulting slurry was then filtered. The wash and filtration were repeated four additional times. The retained cake was dried for six hours at 100° C. The dried cake was then calcined at 900° C. for one hour. The uncalcined cake weighed 121.7 g (2.43% moisture) and contained 50 ppm fluoride. The calcined cake weighed 108 g containing less than 50 ppm fluoride and 78.6% of the material was smaller than 1 micron in size.

The process conditions utilized and results obtained are also set forth in Table 1 below.

Example 7

This example illustrates a laboratory scale embodiment of a preferred process of the present invention for making tantalum pentoxide precursor and a tantalum pentoxide ($Ta_2O_5$) product of the present invention.

Reactor bath double boilers (filled with DOW thermal oil) were set to 180° C. Stock solution of fluorotantalic acid (concentration of 80 g tantalum pentoxide/liter) was preheated to about 66° C. and added to reactor one at an average rate of 30 ml/minute. A stock solution of 5N (7.8 wt. %) ammonia was added to the first reactor at an average rate of 35 ml/minute. The reactants were agitated with a resultant average temperature and pH of 74° C. and 8.42, respectively.

The resulting suspension flowed into the second reactor for further agitation with a resultant average temperature and pH of 77° C. and 8.20, respectively. The suspension then flowed into the third reactor for further agitation with a resultant average temperature and pH of 82° C. and 7.97, respectively. The reaction was run for 255 minutes, prior to collection of samples, for a total of about six residence times, average residence time being 46 minutes.

Four liters of suspension were collected and filtered. The filtered cake was washed and re-slurried with two liters of 5N (7.8 wt. %) ammonia solution at about 85° C. The resulting slurry was then filtered. The wash and filtration were repeated four additional times. The resulting retained cake was dried for six hours at 100° C. The dried cake was then calcined at 900° C. for one hour. The uncalcined cake weighed 231.8 g (1.35% moisture) containing 310 ppm fluoride and 95.8% of the material was smaller than 8 microns in size.

The process conditions utilized and results obtained are also set forth in Table 1 below.

Example 8

This example illustrates a laboratory scale embodiment of a preferred process of the present invention for making tantalum pentoxide precursor and a tantalum pentoxide ($Ta_2O_5$) product of the present invention.

Reactor bath double boilers (filled with DOW thermal oil) were set to 190° C. Stock solution of fluorotantalic acid (concentration of 80 g tantalum pentoxide/liter) was preheated to about 73° C. and added to reactor one at an average rate of 25 ml/minute. A stock solution of 5N (7.8 wt. %) ammonia was added to the first reactor at an average rate of 18 ml/minute. The reactants were agitated with a resultant average temperature and pH of 83° C. and 7.53, respectively.

The resulting suspension flowed into the second reactor where an additional 50 ml/minute of ammonia stock solution was added with agitation. The resultant average temperature and pH in the second reactor were 60° C. and 9.50, respectively. The resulting suspension then flowed into the third reactor for further mixing with a resultant average temperature and pH of 71° C. and 9.08, respectively. The reaction was run for 255 minutes, prior to collection of samples, for a total of approximately eight residence times, average residence time being 33 minutes.

Six liters of suspension were collected and filtered. The filtered cake was washed and re-slurried with two liters of 5N (7.8 wt. %) ammonia solution at about 85° C. The resulting slurry was then filtered. The wash and filtration were repeated four additional times. The retained cake was dried for six hours at 100° C. The dried cake was then calcined at 900° C. for one hour. The uncalcined cake weighed 128.9 g (4.07% moisture) and contained 50 ppm fluoride. The calcined cake weighed 107.2 g containing less than 50 ppm fluoride and 71.9% of the material was within the size range of 8 to 32 microns.

The process conditions utilized and results obtained are also set forth in Table 1 below.

Example 9

This example illustrates a laboratory scale embodiment of a preferred process of the present invention for making tantalum pentoxide precursor and a tantalum pentoxide ($Ta_2O_5$) product of the present invention.

The reactor train design and layout was as depicted in FIG. 1. The working volume of the 3 reactors was 1000 ml per reactor. Dowtherm was used for the heat exchange from the vessels to the 3 reactors. The use of variable speed agitators set at approximately 550 rpm was used in the 3 reactors.

Stock solution of fluorotantalic acid (concentration of 87 g. tantalum pentoxide/liter) and 0.7% by volume EDTA was added to reactor 1 at a constant rate. Stock solution of 30% ammonium hydroxide ($NH_4OH$) was added to the first reactor at an automated rate to achieve an average pH of 7.49. The average temperature of the reactants in reactor 1 was 63.92° C. Stock solution of 30% ammonium hydroxide ($NH_4OH$) was then added to the second reactor at a constant rate with a resulting average pH of 8.55 and temperature of 61.8° C. The resulting suspension in the second reactor then flowed into the third reactor for further agitation with an average temperature and pH of 63.5° C. and 8.14 respectively. The reaction was run for 240 minutes prior to collection of samples, for a total of 4 residence times, average residence time being 120 minutes. The product from the collection vessel was then filtered, washed, and re-slurried in an ammonia solution 5 times. The retained cake was vacuum dried at 110° C. for 3 hours (10% moisture) and contained 90 ppm fluorides. The cake was then calcined at 1050° C. for 1 hour (14% moisture) and contained 70 ppm fluoride.

The process conditions utilized and results obtained are also set forth in Table 1 below.

Example 10

This example illustrates a laboratory scale embodiment of a preferred process of the present invention for making tantalum pentoxide precursor and a tantalum pentoxide ($Ta_2O_5$) product of the present invention.

The reactor train design and layout was as depicted in FIG. 1. The working volume of the 3 reactors was 1000 ml per reactor. Dowtherm was used for the heat exchange from the vessels to the 3 reactors. The use of variable speed agitators set at approximately 550 rpm was used in the 3 reactors.

Stock solution of fluorotantalic acid (concentration of 87 g. tantalum pentoxide/liter) and 0.7% by volume EDTA was added to reactor 1 at a constant rate. Stock solution of 30% ammonium hydroxide ($NH_4OH$) was added to the first reactor at an automated rate to achieve an average pH of 9.51. The average temperature of the reactants in reactor 1 was 55.6° C. Stock solution of 30% ammonium hydroxide ($NH_4OH$) was then added to the second reactor at a constant rate with a resulting average pH of 9.06 and temperature of 53.3° C. The resulting suspension in the second reactor then flowed into third reactor for further agitation with an average temperature and pH of 55° C. and 8.84 respectively. The reaction was run for 240 minutes prior to collection of samples, for a total of 4 residence times, average residence time being 120 minutes. The product from the collection vessel was then filtered, washed, and re-slurried in an ammonia solution 5 times. The retained cake was vacuum dried at 110° C. for 3 hours (41% moisture) and contained 130 ppm fluorides. The cake was then calcined at 900° C. for 1 hour (35% moisture) and contained 70 ppm fluoride.

The process conditions utilized and results obtained are also set forth in Table 1 below.

and tantalum pentoxide ($Ta_2O_5$) products which fall within the scope of the present invention.

These results also illustrate that the rate of precipitation and residence time in the reactors for particle ripening can increase product density. Scanning electron photomicrographs of material precipitated near the isoelectric point of 7.7 for $Nb_2O_5$ with a 115 minute and a 12 minute residence time are shown in FIGS. 2 and 3, respectively. FIGS. 2a, 2b, 2c and 2d are scanning electron photomicrographs of the $Nb_2O_5$ produced in Example 3, at different magnifications. FIGS. 3a, 3b, 3c and 3d are scanning electron photomicrographs of the $Nb_2O_5$ produced in Example 5, at different magnifications. FIGS. 4a, 4b, 4c and 4d are scanning electron photomicrographs of the $Ta_2O_5$ produced in Example 9, at different magnifications. FIGS. 5a, 5b, 5c and 5d are scanning electron photomicrographs of the $Ta_2O_5$ produced in Example 10, at different magnifications.

As shown in FIGS. 2a-2d and 3a-3d, the low density particles produced and the 12 minute residence time and calcined (FIGS. 3a-3d) are very obvious versus the much denser particles of material produced with a 115 minute residence time (FIGS. 2a-2d). Furthermore, because the crystallites are very closely packed, crystal intergrowth and densification has been further assisted as can be seen in the photomicrographs.

FIGS. 5a-5d show the fine calcined particles of $Ta_2O_5$ produced at pH 9.5 with a 2 hour residence time. FIGS. 4a-4d show similar dense particles of $Ta_2O_5$ produced at a pH of 7.5 and a 120 minute residence time.

These photomicrographs FIGS. 2a-d, 3a-d, 4a-d and 5a-d exemplify a range of particles which can be produced utilizing the technology of the present invention.

The examples discussed herein further illustrate that the products of the present invention are ammonium fluoride and a microcrystalline valve metal pentoxide hydrates with

TABLE 1

| | Example | | | | | | | | | |
|---|---|---|---|---|---|---|---|---|---|---|
| | 1 | 2 | 3 | 4 | 5 | 6 | 7 | 8 | 9 | 10 |
| Compound | $Nb_2O_5$ | $Nb_2O_5$ | $Nb_2O_5$ | $Nb_2O_5$ | $Nb_2O_5$ | $Ta_2O_5$ | $Ta_2O_5$ | $Ta_2O_5$ | $Ta_2O_5$ | $Ta_2O_5$ |
| pH Rx. 1 | 8.52 | 9.14 | 7.78 | 6.28 | 7.72 | 9.01 | 8.42 | 7.53 | 7.5 | 9.51 |
| pH Rx. 2 | 8.39 | 8.28 | 8.48 | 8.46 | 8.49 | 8.73 | 8.2 | 9.5 | 8.5 | 9.06 |
| Total Residence Time (Min.) | 31 | 27 | 115 | 42 | 12 | 38 | 46 | 33 | 120 | 120 |
| Temp. ° C. Rx 1 | 74 | 61 | 76 | 80 | 80 | 67 | 74 | 83 | 64 | 56 |
| Rx. Split Rx. 1%:Rx. 2% | 100:0.0 | 70:30 | 33:67 | 62:38 | 76:67 | 100:0 | 100:0 | 26:74 | 52:48 | 100:0 |
| Filtered F (ppm) | 21500 | 80000 | 64000 | 135000 | 13500 | 54000 | 75000 | 7500 | 32000 | 96000 |
| Uncalcined Washed F (ppm) | 260 | 460 | 1400 | 3600 | 2350 | 50 | 310 | <50 | 90 | 130 |
| Calcined F (ppm) | 100 | 100 | 200 | 300 | 100 | <50 | 200 | 80 | 120 | 70 |
| Settled Vol. ml. | 240 | 270 | 20 | 320 | 90 | 155 | 120 | 15 | 30 | 176 |
| Freefall Density g/cc | 1.24 | 1.57 | 1.51 | 1.23 | 0.74 | 1.36 | 1.32 | 2.35 | 2.65 | 0.98 |
| Packed Density g/cc | 1.71 | 1.84 | 2.06 | 1.62 | 1.02 | 1.81 | 1.77 | 2.96 | 3.98 | 1.60 |
| Uncalcined Percent Moisture | 28.4 | 44.3 | 29.1 | 49.9 | 35.8 | 11.3 | 11.9 | 16.3 | 10 | 35 |
| % < 1 μm | 70.3 | 15.3 | 1.4 | 30.5 | 28.4 | 78.6 | 10.6 | 5.8 | 0 | 2.7 |
| 90%, < μm size | 1.5 | 150 | 27 | 96 | 20 | 5 | 5 | 55 | 35 | 3.5 |
| Surface Area $m^2/g$ | 2.82 | — | 0.5 | 2.18 | — | 6.7 | — | 4.96 | 1.01 | 5.17 |

Rx. 1 = Reaction in first reaction vessel
Rx. 2 = Reaction in second reaction vessel
% < 1 μm = percentage of product smaller than 1 micrometer
90% < μm = the particle size where 90% of particles are less than or equal to the size The results set forth in Table 1 indicate that a preferred process of the present invention may be utilized to produce a wide variety of niobium pentoxide precursors, niobium pentoxide ($Nb_2O_5$) products, tantalum pentoxide precursors a readily defined line broadened x-ray diffraction pattern and the calcined pentoxide analog.

Figure 6:
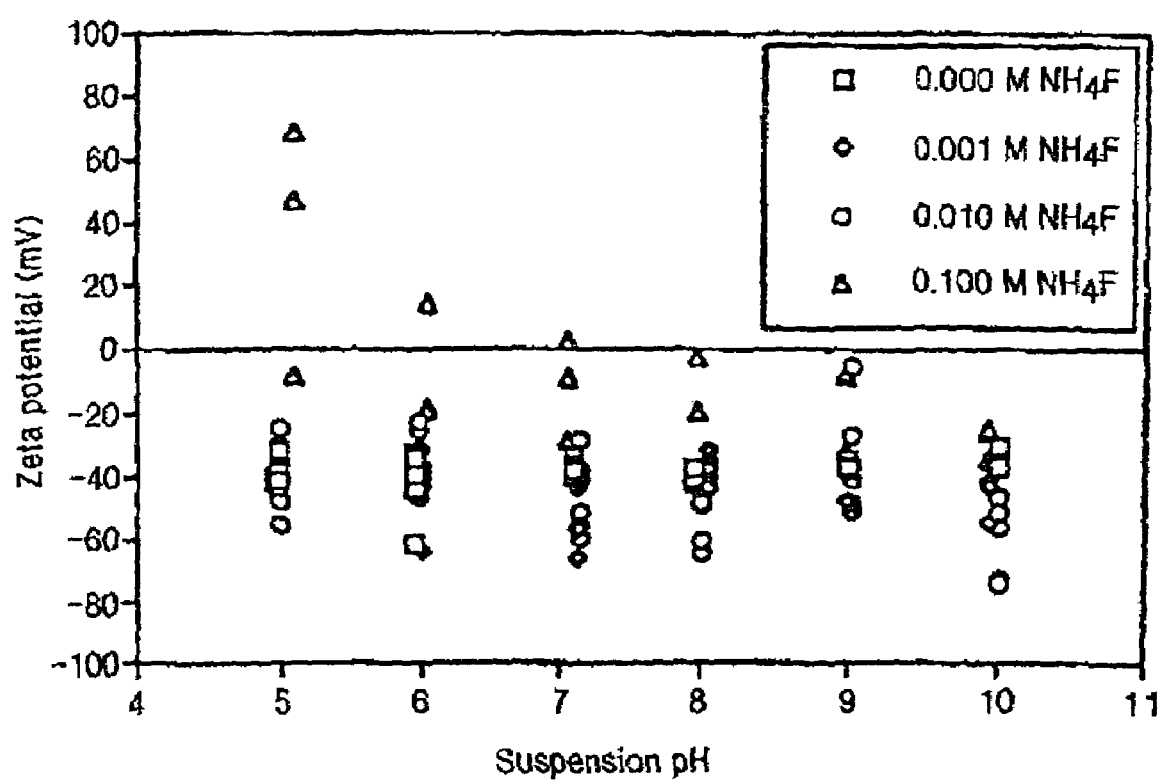
FIG. 6 is a graph of Zeta potential as a function of pH for tantalum hydroxide filtercake suspensions, at various concentrations of $NH_4F$.

The Zeta potential of the pentoxide hydrate in the presence of ammonium fluoride is negative at pH's of 8 or greater and positive at pH's of 6 or less as shown by FIG. 6. The isoelectric point or point of zero charge is in the range of pH 7-8. Precipitation at the isoelectric point allows agglomeration and formation of dense substantially spherical particles. This feature of the process of the present invention allows the control of precipitated particle sizes. At pH's above and below the isoelectric point, the charged particles repel one another preventing agglomeration and fine particles are precipitated.

It should be clearly understood that the forms of the present invention herein described are illustrative only and are not intended to limit the scope of the invention.

What is claimed is:

1. A calcined niobium pentoxide powder characterized by having:
   a BET surface area less than or equal to 3 $m^2/g$; and
   a packed bulk density of greater than 1.8 g/cc.

2. The calcined niobium pentoxide powder of claim 1, wherein the BET surface area is less than, or equal to, 1 $m^2/g$.

3. The calcined niobium pentoxide powder of claim 1, wherein the packed bulk density is greater than or equal to 2.1 g/cc.

4. The calcined niobium pentoxide powder of claim 1, wherein said BET surface area is less than or equal to 0.5 $m^2/g$.

5. The calcined niobium pentoxide powder of claim 1, wherein said powder is spherical particles.

6. The calcined niobium pentoxide powder of claim 1, wherein said powder has a fluoride content of less than or equal to 500 ppm.

7. The calcined niobium pentoxide powder of claim 1, wherein said powder has a fluoride content of less than or equal to 150 ppm.

8. The calcined niobium pentoxide powder of claim 1, wherein said calcined niobium pentoxide powder has a size such that 70% or less of said powder has a size less than 1 micrometer.

9. The calcined niobium pentoxide powder of claim 1, wherein said calcined niobium pentoxide powder has a size such that less than 1% of said powder has a size less than 1 micrometer.

10. The calcined niobium pentoxide powder of claim 1, wherein said calcined niobium pentoxide powder comprises a fine single crystallite shape.

11. The calcined niobium pentoxide powder of claim 1, wherein said calcined niobium pentoxide powder comprises spherical agglomerates.

12. The calcined niobium pentoxide powder of claim 1, wherein 100% of the calcined niobium pentoxide powder is below 24 microns in size.

13. The calcined niobium pentoxide powder of claim 1, wherein said calcined niobium pentoxide powder has a particle size wherein 90% of the powder is less than or equal to a size of 1.5 microns to 150 microns.

14. The calcined niobium pentoxide powder of claim 1, wherein said calcined niobium pentoxide powder has a particle size wherein 90% of the powder is less than or equal to a size of 27 microns to 96 microns.

15. The calcined niobium pentoxide powder of claim 1, wherein from 1.4% to 70.3% of the calcined niobium pentoxide powder has a particle size of less than 1 micron.

16. The calcined niobium pentoxide powder of claim 1, wherein 15.3% to 30.5% of the calcined niobium pentoxide powder has a particle size of less than 1 micron.

17. A calcined niobium pentoxide powder characterized by having:
   a BET surface area of greater than or equal to 2 $m^2/g$; and
   a packed bulk density of less than or equal to 1.8 g/cc.

18. The calcined niobium pentoxide powder of claim 17, wherein the BET surface than or equal to 6 $m^2/g$.

19. The calcined niobium pentoxide powder of claim 17, wherein the packed bulk density is less than or equal to 1.0 g/cc.

20. The calcined niobium pentoxide powder of claim 17, wherein the BET surface area is from 2 $m^2/g$ to 6 $m^2/g$.

21. The calcined niobium pentoxide powder of claim 17, wherein the BET surface area is from 2 $m^2/g$ to 4 $m^2/g$.

22. The calcined niobium pentoxide powder of claim 17, wherein the BET surface area is from 4 $m^2/g$ to 6 $m^2/g$.

23. The calcined niobium pentoxide powder of claim 17, wherein said packed bulk density is less than or equal to 1.0 g/cc.

24. The calcined niobium pentoxide powder of claim 17, wherein said packed bulk density is less than or equal to 0.75 g/cc.

25. The calcined niobium pentoxide powder of claim 17, wherein said packed bulk density is from 1.0 g/cc to 0.75 g/cc.

26. The calcined niobium pentoxide powder of claim 17, wherein said powder has a fluoride content of less than or equal to 500 ppm.

27. The calcined niobium pentoxide powder of claim 17, wherein said powder has a fluoride content of less than or equal to 150 ppm.

* * * * *